United States Patent
Turkkan et al.

(10) Patent No.: US 12,299,397 B2
(45) Date of Patent: May 13, 2025

(54) DETERMINING SEMANTIC SIMILARITY OF TEXTS BASED ON SUB-SECTIONS THEREOF

(71) Applicant: ServiceNow, Inc., Santa Clara, CA (US)

(72) Inventors: Omer Anil Turkkan, Santa Clara, CA (US); Firat Karakusoglu, San Jose, CA (US); Sriram Palapudi, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 567 days.

(21) Appl. No.: 17/448,667

(22) Filed: Sep. 23, 2021

(65) Prior Publication Data

US 2022/0012431 A1     Jan. 13, 2022

Related U.S. Application Data

(63) Continuation of application No. 16/362,187, filed on Mar. 22, 2019, now Pat. No. 11,151,325.

(51) Int. Cl.
*G06F 40/30* (2020.01)
*G06F 40/205* (2020.01)
*G06F 40/284* (2020.01)

(52) U.S. Cl.
CPC ............ *G06F 40/30* (2020.01); *G06F 40/205* (2020.01); *G06F 40/284* (2020.01)

(58) Field of Classification Search
CPC ....... G06F 40/30; G06F 40/205; G06F 40/284
See application file for complete search history.

(56) References Cited

U.S. PATENT DOCUMENTS

| 6,609,122 B1 | 8/2003 | Ensor |
|---|---|---|
| 6,678,887 B1 | 1/2004 | Hallman |

(Continued)

FOREIGN PATENT DOCUMENTS

| JP | 2002-297660 A | 10/2002 |
|---|---|---|
| JP | 2003281186 A | 10/2003 |

(Continued)

OTHER PUBLICATIONS

Zhao, Yifei, et al. "Paragraph vector based retrieval model for similar cases recommendation." 2016 12th World Congress on Intelligent Control and Automation (WCICA). IEEE, 2016.*

(Continued)

*Primary Examiner* — Jialong He
(74) *Attorney, Agent, or Firm* — FLETCHER YODER PC

(57) ABSTRACT

Systems and methods are provided to compare a target sample of text to a set of textual records, each textual record including a sample of text and an indication of one or more segments of text within the sample of text. Semantic similarity values between the target sample of text and each of the textual records are determined. Determining a particular semantic similarity value between the target sample of text and a particular textual record of the corpus includes: (i) determining individual semantic similarity values between the target sample of text and each of the segments of text indicated by the particular textual record, and (ii) generating the particular semantic similarity value between the target sample of text and the particular textual record based on the individual semantic similarity values. A textual record is then selected based on the semantic similarities.

20 Claims, 16 Drawing Sheets

(56) References Cited

U.S. PATENT DOCUMENTS

| | | |
|---|---|---|
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,219,085 B2 | 5/2007 | Buck et al. |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,533,148 B1 | 9/2013 | Feuersaenger et al. |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 8,983,982 B2 | 3/2015 | Rangarajan |
| 9,239,857 B2 | 1/2016 | Trinon |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,792,387 B2 | 10/2017 | George |
| 2004/0078363 A1* | 4/2004 | Kawatani ............... G06F 16/93 |
| 2004/0181511 A1* | 9/2004 | Xu ..................... G06F 16/3347 |
| 2007/0073745 A1 | 3/2007 | Scott et al. |
| 2008/0082968 A1 | 4/2008 | Chang et al. |
| 2010/0257159 A1* | 10/2010 | Uematsu ............... G06F 16/334 707/723 |
| 2013/0054574 A1 | 2/2013 | Turchetto |
| 2013/0318063 A1 | 11/2013 | Ayzenshtat et al. |
| 2015/0088910 A1 | 3/2015 | Misra |
| 2017/0011643 A1 | 1/2017 | Wang |
| 2017/0161357 A1* | 6/2017 | Bao ..................... G06F 16/285 |
| 2017/0322930 A1* | 11/2017 | Drew ................... G06F 16/338 |
| 2018/0173792 A1 | 6/2018 | Kesin |
| 2018/0300407 A1 | 10/2018 | Wolny et al. |
| 2018/0329999 A1 | 11/2018 | Kale et al. |
| 2018/0341686 A1 | 11/2018 | Hu |
| 2019/0065506 A1 | 2/2019 | Li et al. |
| 2019/0138613 A1* | 5/2019 | Adada ................... G06N 20/00 |
| 2019/0197129 A1* | 6/2019 | Yong ................... G06F 16/3347 |
| 2019/0243900 A1* | 8/2019 | Gan ..................... G06F 16/3329 |
| 2020/0005145 A1 | 1/2020 | Sung |
| 2020/0073890 A1 | 3/2020 | Shamos |
| 2020/0089947 A1* | 3/2020 | van Rotterdam .. G06K 9/00469 |
| 2020/0134015 A1* | 4/2020 | Kumagai .............. G06F 40/284 |
| 2020/0184016 A1* | 6/2020 | Roller ..................... G06N 3/08 |
| 2020/0193153 A1* | 6/2020 | Lee ....................... G06F 40/226 |

FOREIGN PATENT DOCUMENTS

| | | |
|---|---|---|
| JP | 2010066964 A | 3/2010 |
| WO | 00/79426 A1 | 12/2000 |
| WO | 0079426 A | 12/2000 |

OTHER PUBLICATIONS

Hien T. Nguyen et al.: "A Multifaceted Approach to Sentence Similarity", International Conference on Financial Cryptography and Data Security (Lecture Notes in Computer Science; Lecture Notes Computer), Jan. 1, 2016; pp. 303-314 (XP047414518) [retrieved on Jan. 1, 2016].

Hassan Sajjad and Helmut Schmid, "Tagging Urdu Text with Parts of Speech: A Tagger Comparison", Proceedings of the 12th Conference of the European Chapter of the ACL, 2009, pp. 692-700.

Neha Agarwal et al., "Sentence Boundary Detection Using a MaxEnt Classifier", Proceedings of the 12th Conference of MISC, 2005, pp. 1-6.

Examination Report for Australian Patent Application No. 2020248738 dated Feb. 28, 2023; 5 pgs.

Notice of Acceptance for Australian Patent Application No. 2020248738 dated Sep. 5, 2023; 3 pgs.

Notice of Rejection for Japanese Patent Application No. 2023-210677 dated Jan. 29, 2025; 3 pgs.

* cited by examiner

600

| ORIGINATOR | BOB SMITH | ← 602 |
|---|---|---|
| CREATED | 2018-02-07 9:56AM | ← 604 |
| SHORT DESCRIPTION | CAN'T CONNECT TO EMAIL | ← 605 |
| PROBLEM DESCRIPTION | MY EMAIL CLIENT IS NOT DOWNLOADING NEW EMAILS. I AM CONNECTED TO THE WIRELESS NETWORK AND CAN ACCESS THE INTERNET, BUT MY CLIENT KEEPS REPORTING THAT IT IS UNABLE TO ACCESS THE SERVER. | ← 606 |
| CATEGORY | EMAIL | ← 608 |
| ASSIGNED TO | ALICE JONES | ← 610 |
| STATUS | RESOLVED | ← 612 |
| RESOLUTION | BOB'S LAPTOP WAS CONNECTED TO THE "GUEST" WIRELESS NETWORK, WHICH IS OUTSIDE OF THE FIREWALL. I TOLD HIM THAT HE COULD EITHER USE THE VPN TO ACCESS HIS EMAIL, OR CONNECT TO THE "EMPLOYEE" WIRELESS NETWORK, WHICH REQUIRES THE PASSWORD BUT IS INSIDE THE FIREWALL. | ← 614 |
| RESOLVED TIME | 2018-02-07 10:10AM | ← 616 |
| CLOSURE CODE | SOLVED (PERMANENTLY) | ← 618 |
| NOTES | THIS IS THE THIRD TIME IN A WEEK THAT I'VE HAD TO ADDRESS A SIMILAR ISSUE. CAN WE POST WIRELESS NETWORKING INSTRUCTIONS IN ALL CONFERENCE ROOMS? | ← 620 |
| LINK TO KNOWLEDGE BASE | ITKB/WIRELESS/CONFIGURATION.HTML | ← 622 |

FIG. 6

DETERMINING SEMANTIC SIMILARITY OF TEXTS BASED ON SUB-SECTIONS THEREOF

CROSS-REFERENCE TO RELATED APPLICATIONS

This application is a continuation of and claims priority to U.S. patent application Ser. No. 16/362,187, filed Mar. 22, 2019, which is hereby incorporated by reference in its entirety

BACKGROUND

It is beneficial in a variety of applications to determine a similarity between samples of text or to otherwise compare samples of text. This can be done in order to identify, from a corpus of text samples, one or more samples that are similar in some respect to a target sample of text. For example, a target sample of text could contain a user's description of an information technology problem, and the target sample could be compared to articles in a database that describe a variety of information technology topics and/or solutions to information technology problems. By comparing the user's description of the problem to the articles in the database, one or more "most relevant" or otherwise similar articles can be provided to the user and/or to a technician in order to efficiently guide them to a solution.

SUMMARY

Natural language processing or other methods can be used to compare samples of text. This can be done in order to find patterns within the samples of text, to identify samples that are relevant to a query or otherwise similar to a target sample of text, or to provide some other benefit. For example, a query can include a sample of text describing a problem that a user is experiencing. Similarity values can then be determined between the query text and the text of articles within a database, so that one or more articles that are most similar to the query may be provided to the user. This comparison may improve the quality of results provided to the user and/or reduce the amount of time spent by the user before determining and implementing a solution to the problem.

However, when articles or other samples of text are large (e.g., relative to query texts), it can become difficult to compare the articles with query text in a way that generates useful results. For example, longer articles may contain sub-sections that are relevant to a particular query text, but also contain other portions that are not relevant. As a result, such relevant articles might not be detected, due to the effects of the non-relevant portions of the articles.

To address this issue, articles or other large samples of text may be partitioned into segments. The segments may be determined according to sentences, paragraphs, or other punctuation within the large sample of text, using a segmenting algorithm that has been trained based on a sample of query texts, or according to some other method. This could be done so that the segments of text are of similar size to the queries to which they are likely to be compared. Similarity values can then be made between a query text and each segment of each of the large samples of text. An overall similarity value for a particular large sample of text can then be determined based on the similarity values for each of the text segments within the large sample of text. This could include adding together the segment similarity values, determining a maximum segment similarity value, determining how many of the segment similarity values exceed a threshold, or some other method. The overall similarity values for the large samples of text can then be used to select large samples of text that are relevant to a query text or to facilitate some other application.

Accordingly, a first example embodiment may involve a computer-implemented method that includes: (i) obtaining, by a server device, a corpus of textual records, where each of the textual records includes a sample of text and an indication of one or more segments of text within the sample of text, wherein at least one of the textual records includes an indication of at least two segments of text within the sample of text; (ii) obtaining, by the server device and from a client device, a target sample of text; (iii) determining, by the server device, semantic similarity values between the target sample of text and each of the textual records; (iv) based on the semantic similarity values, selecting, by the server device and from the corpus, a textual record with a semantic similarity indicating that the textual record is more similar to the target sample of text than any other of the textual records; and (v) providing, by the server device and to the client device, a representation of the textual record. Determining a particular semantic similarity value between the target sample of text and a particular textual record of the corpus includes: (i) determining individual semantic similarity values between the target sample of text and each of the segments of text indicated by the particular textual record, and (ii) generating the particular semantic similarity value between the target sample of text and the particular textual record based on the individual semantic similarity values.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

In some embodiments, each of the textual records includes a respective indication of at least two segments of text within the respective sample of text. That is, all of the textual records can include multiple segments of text. Alternatively, one or more of the textual records may include only a single segment of text. For example, shorter samples of text may not be broken up into multiple segments.

In some embodiments, determining an individual semantic similarity value between the target sample of text and a particular segment of text within the particular textual record includes: (i) obtaining a vector representation of the target sample of text, wherein the vector representation of the target sample of text includes at least one of (a) word vectors that describe, in a first semantically-encoded vector space, a meaning of respective words of the target sample of text, or (b) a paragraph vector that describes, in a second semantically-encoded vector space, a meaning of multiple words of the target sample of text; (ii) obtaining a vector representation of the particular segment of text, wherein the vector representation of the particular segment of text includes at least one of (a) word vectors that describe, in the first semantically-encoded vector space, a meaning of respective words of the particular segment of text, or (b) a paragraph vector that describes, in the second semantically-encoded vector space, a meaning of multiple words of the particular segment of text; and (iii) determining a semantic similarity value between the vector representation of the target sample of text and the vector representation of the particular segment of text.

In some embodiments, generating the particular semantic similarity value between the target sample of text and the particular textual record based on the individual semantic similarity values includes: (i) comparing, to a threshold similarity level, each of the individual semantic similarity values between the target sample of text and each of the segments of text indicated by the particular textual record; and (ii) determining a number of the individual semantic similarity values that exceeded the threshold similarity level as the particular semantic similarity value.

In some embodiments, generating the particular semantic similarity value between the target sample of text and the particular textual record based on the individual semantic similarity values includes: (i) generating a sum of the individual semantic similarity values between the target sample of text and each of the segments of text indicated by the particular textual record; and (ii) normalizing the sum to a number of segments of text indicated by the particular textual record.

In some embodiments, the indications of one or more segments of text within each sample of text indicate non-overlapping segments of text.

In some embodiments, the indications of one or more segments of text within each sample of text indicate segments of text that each represent one or more discrete sentences.

In some embodiments, the method performed additionally includes: (i) obtaining, from one or more client devices, a plurality of queries, wherein each query includes a sample of text; (ii) training a machine learning model, based on the plurality of queries, to predict related segments of text within samples of text; and (iii) applying the machine learning model as trained to the corpus of textual records to generate the indications of one or more segments of text within the samples of text of the corpus of textual records.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 depicts an incident report, in accordance with example embodiments.

DETAILED DESCRIPTION

Figure 1:
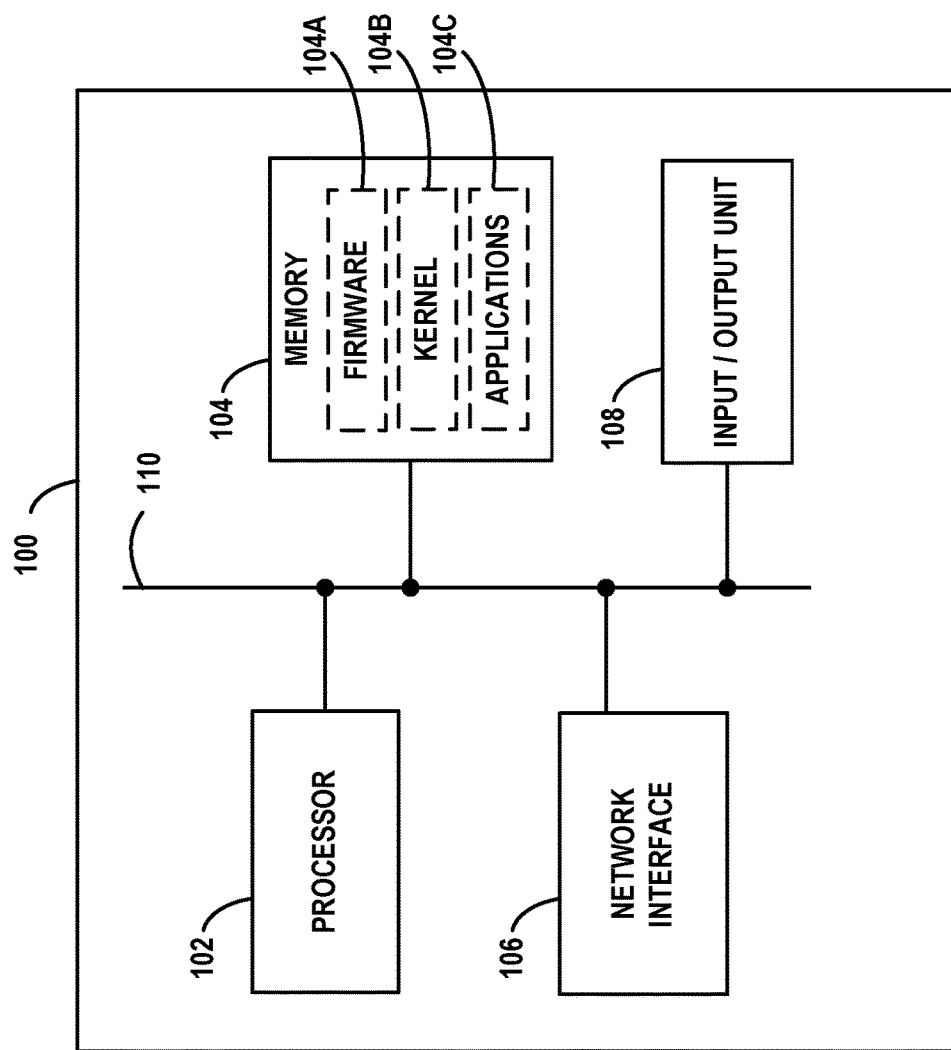
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
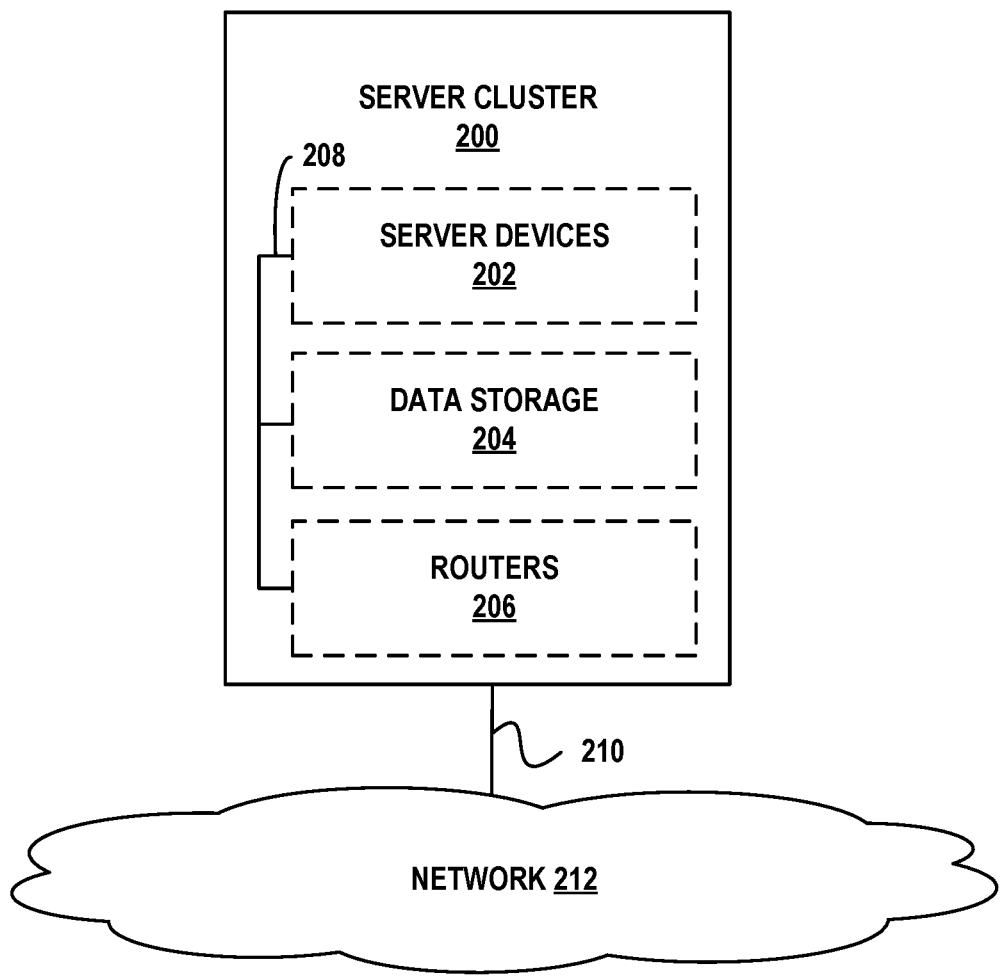
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
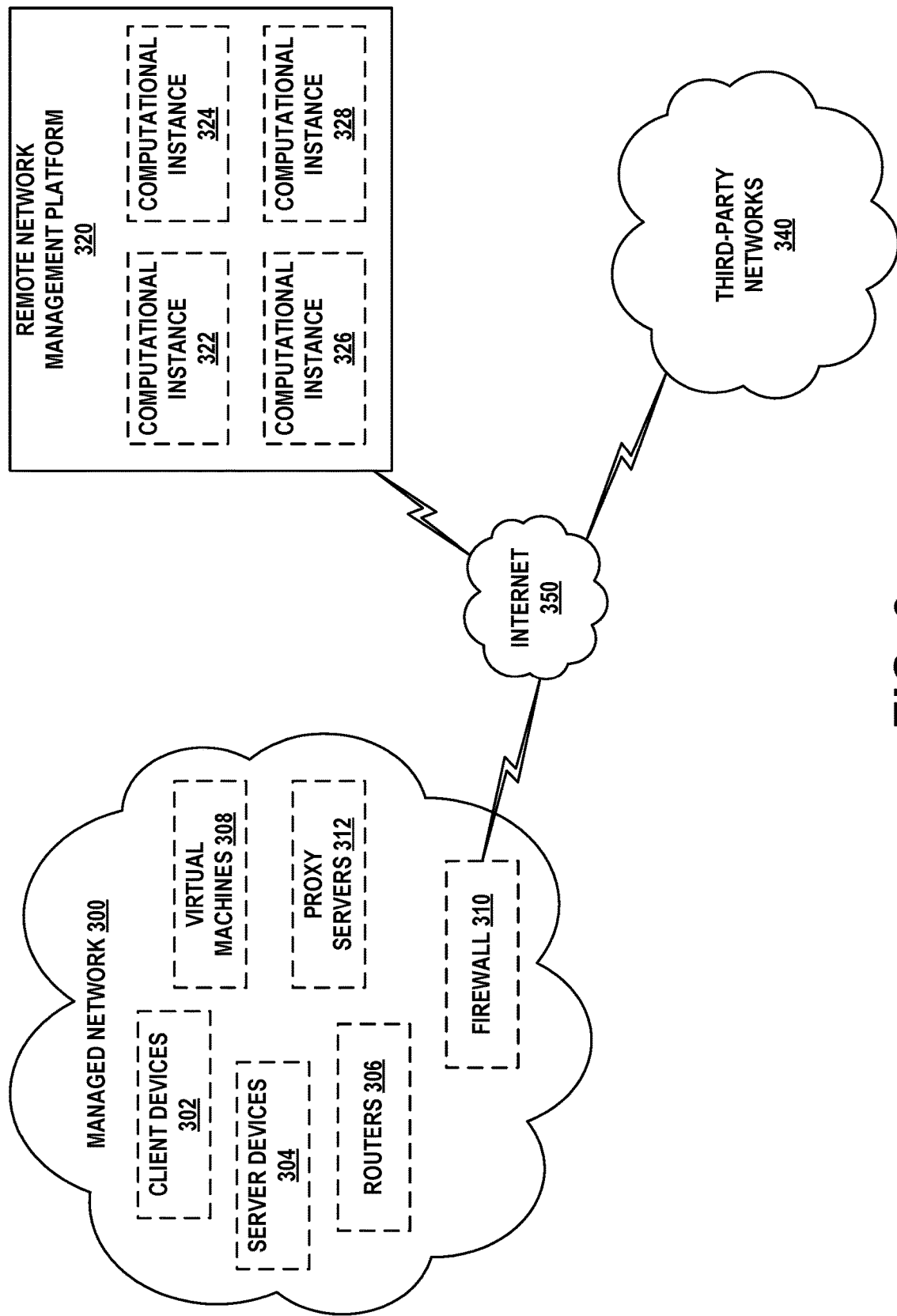
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
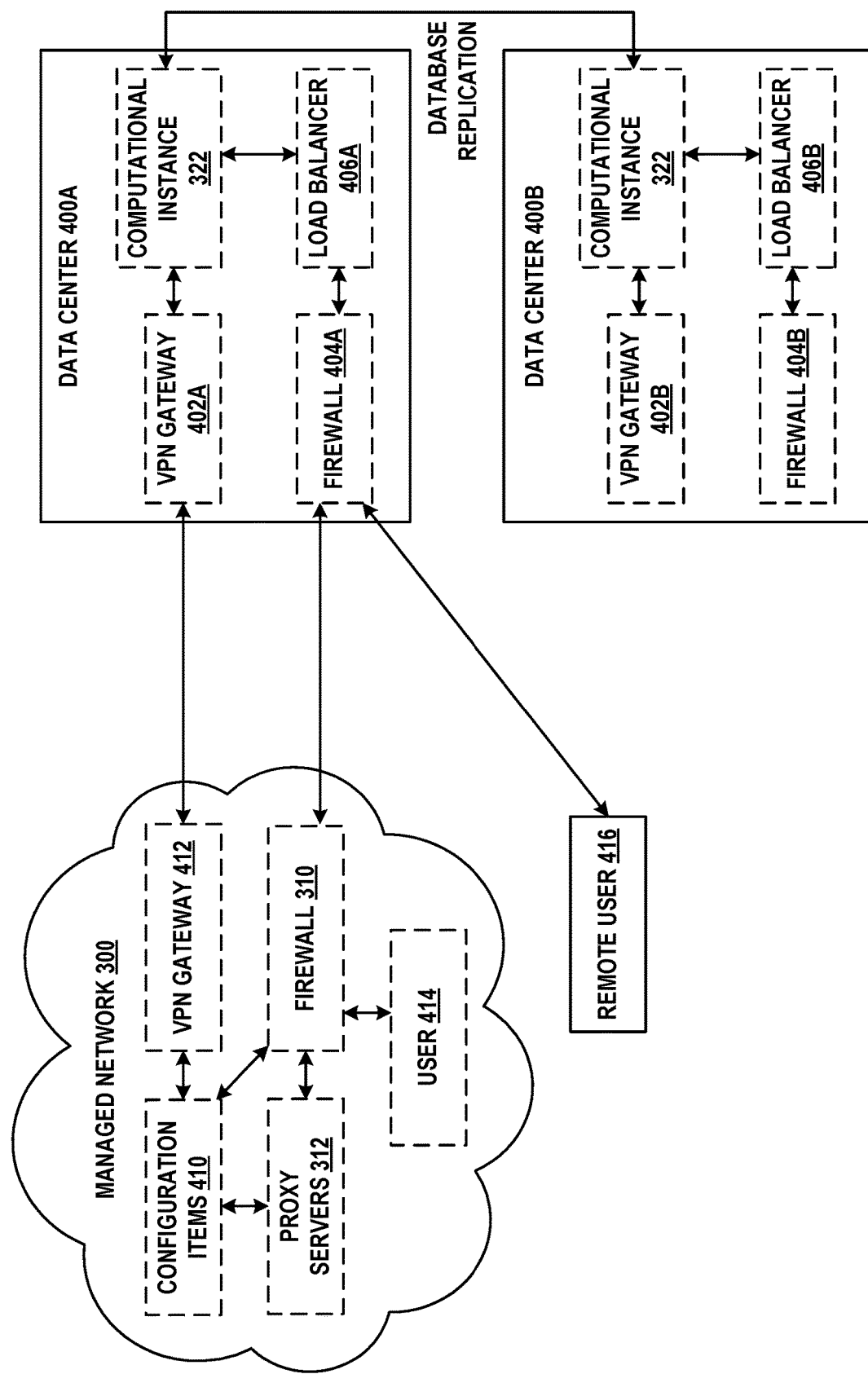
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
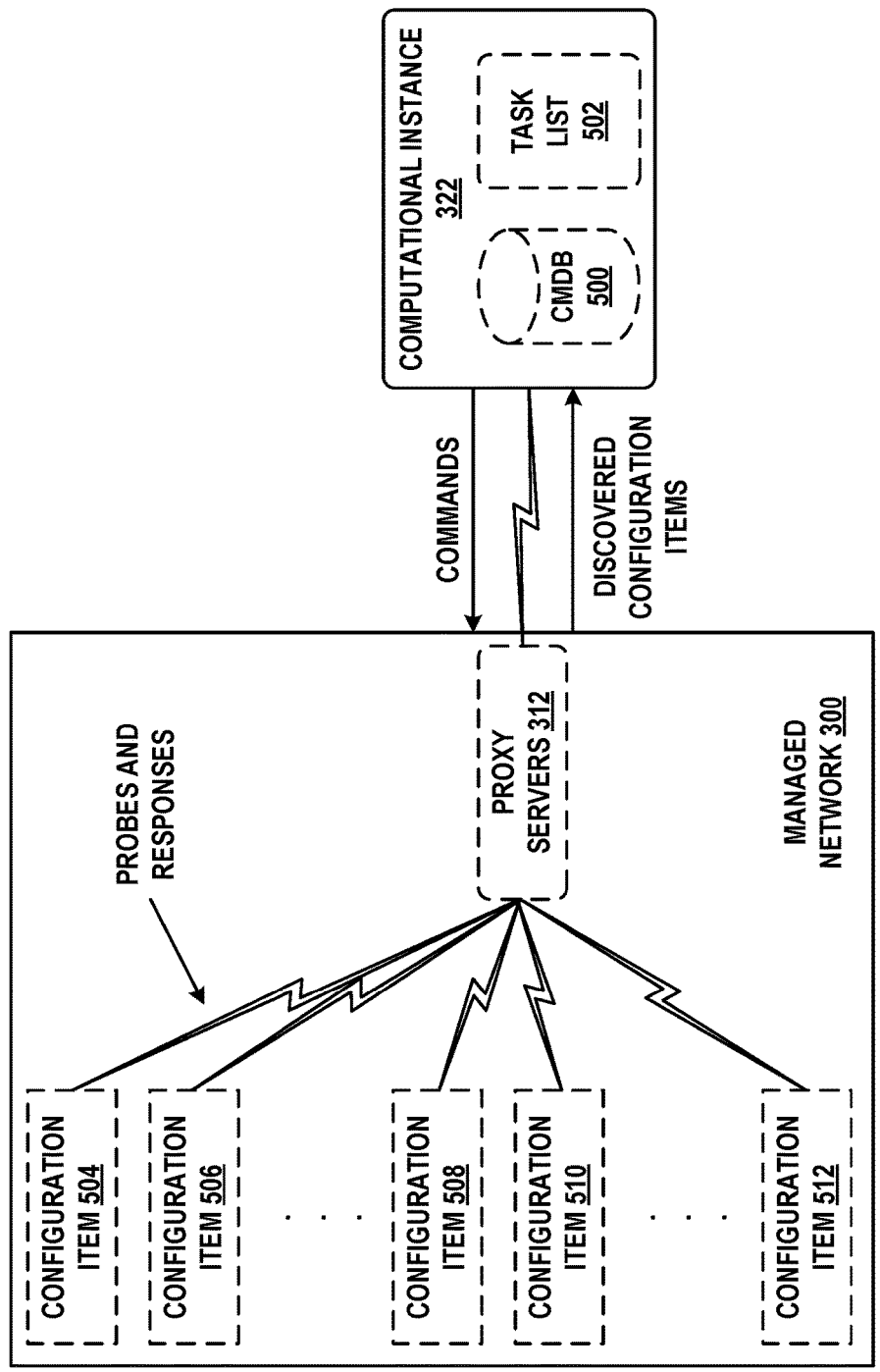
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
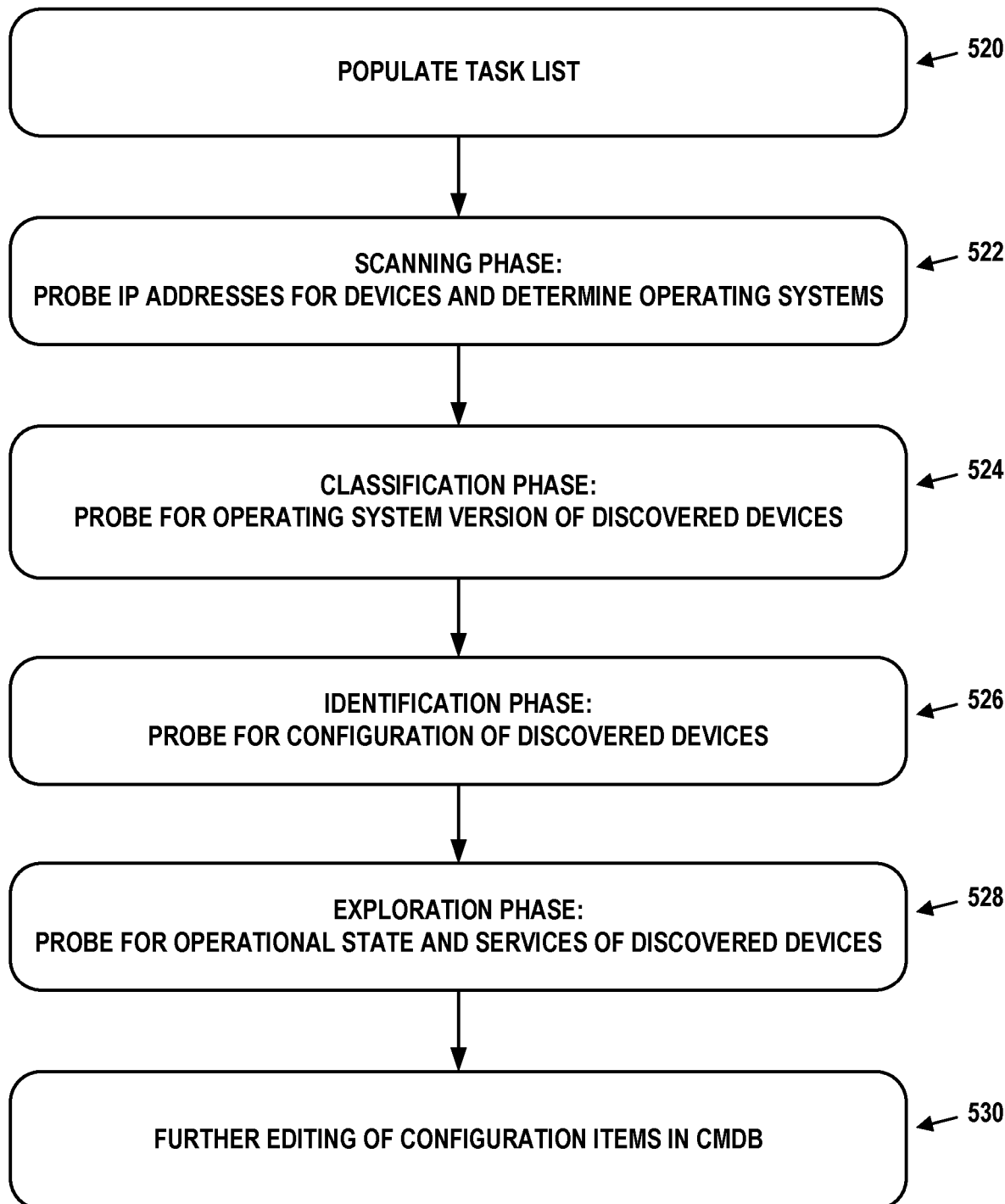
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. NATURAL LANGUAGE PROCESSING OF TEXT QUERIES

Natural language processing is a discipline that involves, among other activities, using computers to understand the structure and meaning of human language. This determined structure and meaning may be applicable to the processing of IT incidents, as described below.

Each incident may be represented as an incident report. While incident reports may exist in various formats and contain various types of information, an example incident report 600 is shown in FIG. 6. Incident report 600 consists of a number of fields in the left column, at least some of which are associated with values in the right column.

Field 602 identifies the originator of the incident, in this case Bob Smith. Field 604 identifies the time at which the incident was created, in this case 9:56 AM on Feb. 7, 2018. Field 605 is a text string that provides a short description of the problem. Field 606 identifies the description of the problem, as provided by the originator. Thus, field 606 may be a free-form text string containing anywhere from a few words to several sentences or more. Field 608 is a categorization of the incident, in this case email. This categorization may be provided by the originator, the IT personnel to whom the incident is assigned, or automatically based on the context of the problem description field.

Field 610 identifies the IT personnel to whom the incident is assigned (if applicable), in this case Alice Jones. Field 612 identifies the status of the incident. The status may be one of "open," "assigned," "working," or "resolved" for instance. Field 614 identifies how the incident was resolved (if applicable). This field may be filled out by the IT personnel to whom the incident is assigned or another individual. Field 616 identifies the time at which the incident was resolved, in this case 10:10 AM on Feb. 7, 2018. Field 618 specifies the closure code of the incident (if applicable) and can take on values such as "closed (permanently)", "closed (work around)", "closed (cannot reproduce)", etc. Field 620 identifies any additional notes added to the record, such as by the IT personnel to whom the incident is assigned. Field 622 identifies a link to an online article that may help users avoid having to address a similar issue in the future.

Incident report 600 is presented for purpose of example. Other types of incident reports may be used, and these reports may contain more, fewer, and/or different fields.

Incident reports, such as incident report 600, may be created in various ways. For instance, by way of a web form, an email sent to a designated address, a voicemail box using speech-to-text conversion, and so on. These incident reports may be stored in an incident report database that can be queried. As an example, a query in the form of a text string could return one or more incident reports that contain the words in the text string. Additionally or alternatively, one or more elements of an incident report (e.g., a "short description" field) may be used to query a database of knowledgebase articles, other incident reports, or some other corpus of text. This may be done in order to identify other incident reports, resolved past incident reports, reports on the resolution of past problems, knowledgebase articles, or other information that may be relevant to the incident report in order to facilitate resolution of a problem represented in the incident report.

Figure 7:
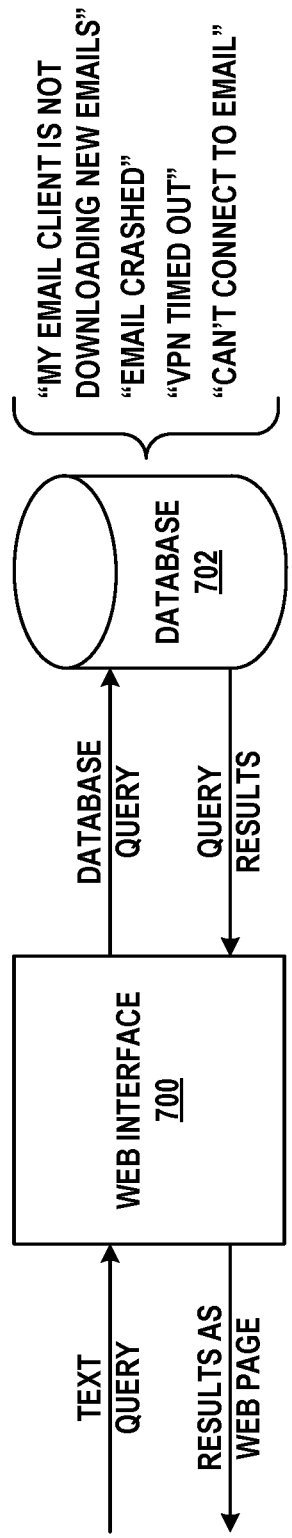
FIG. 7 depicts a database query architecture, in accordance with example embodiments.

This process is illustrated in FIG. 7. A text query may be entered into web interface 700. This web interface may be supplied by way of a computational instance of remote network management platform 320. Web interface 700 converts the text query into a database query (e.g., an SQL query), and provides the SQL query to database 702. This database may be CMDB 500 or some other database. Database 702 contains a number of incident reports with problem description fields as shown in FIG. 6. Regardless, database 702 conducts the query and returns matching results to web interface 700. One or more such results may be returned. Web interface 700 provides these results as a web page.

For example, if the text query is "email", web interface 700 may convert this query into an SQL query of database 702. For example, the query may look at the problem description field of a table containing incident reports. Any such incident report that matches the query—i.e., includes the term "email"—may be provided in the query results.

Thus, the incident reports with the problem descriptions of "My email client is not downloading new emails", "Email crashed", and "Can't connect to email" may be provided, while the incident report with the problem description "VPN timed out" is not returned.

This matching technique is simplistic and has a number of drawbacks. It only considers the presence of the text of the query in the incidents. Thus, it does not consider contextual information, such as words appearing before and after the query text. Also, synonyms of the query text (e.g., "mail" or "message") and misspellings of the query text (e.g., "emial") would not return any results in this example.

Furthermore, deploying such a solution would involve use of an inefficient sparse matrix, with entries in one dimension for each word in the English language and entries in the other dimension for the problem description of each incident. While the exact number of English words is a matter of debate, there are at least 150,000-200,000, with less than about 20,000 in common use. Given that a busy IT department can have a database of tens of thousands of incidents, this matrix would be quite large and wasteful to store even if just the 20,000 most commonly used words are included.

Thus, the above methods of comparison may be replaced by and/or augmented with a variety of methods that compare the semantic content and/or context of text samples. These methods can improve a variety of machine learning techniques to facilitate natural language processing. Such techniques can include determining word and/or paragraph vectors from samples of text, applying artificial neural networks or other deep learning algorithms, sentiment analysis, or other techniques in order to determine a similarity between samples of text. For example, these or other natural language processing techniques can be applied to determine the similarity between one or more text fields of an incident report and other incident reports, resolved incident reports, knowledgebase articles, or other potentially relevant samples of text.

However, particular segments of text within a large sample of text may vary with respect to similarity or relevance to a query text sample. For example, a particular article may include segment(s) that are highly relevant to a particular query text, while the remainder of the article has a similarity to the query text that is much lower. In such examples, determining a similarity value for the article as a whole may result in discarding articles that contain relevant sub-sections. Additionally, providing a user with a particular article or other large sample of text that is overall "relevant" may result in lost time as the user peruses the entire article to find a particular sub-section of relevance to their problem. Further, it can be beneficial to compare text queries to sections of text that are similar with respect to size to the text queries.

It can therefore be beneficial to partition knowledgebase articles or other large samples of text into multiple segments. The similarity between a query text and each of the segments of the large text can then be determined and used to determine whether the large text is relevant to the query text. This could include using the similarity values for each of the segments of the large text to determine an overall similarity value for the large text. Additionally or alternatively, the segments of the large text could be treated as independent text samples. In such an example, a "most relevant" or otherwise most similar segment to a query text could be selected from the set of segments of the text samples, rather than restricting the selection to full text samples.

Determining similarity and/or relevance at the segment level can allow for finer-grained detection of relevant portions of text within a corpus of text samples, preventing relevant portions of larger text samples from being discarded due to making up a relatively small proportion of the large text sample that they are a part of. Further, comparing text queries to text segments having similar size (e.g., number of words, number of clauses, number of sentences) to the text queries may permit more suitable comparisons to be made than comparisons between the text queries and un-segmented samples of text that have sizes that are much larger than the text queries. Additionally, these methods can allow the determination of the overall similarity of large samples of text to be tailored to a particular application. For example, to be more thorough in detecting every relevant portion of text within a corpus of text samples, the similarity value of a particular text sample could be determined as the maximum of the similarity values determined for segments of text within the particular text sample. In another example, articles that are more "on-topic" overall could be selected-for by determining, for each article, an average of the similarity values for segments of text within each article so that articles that only include a single 'similar' segment are disfavored relative to articles that include multiple 'similar' segments.

Figure 8:
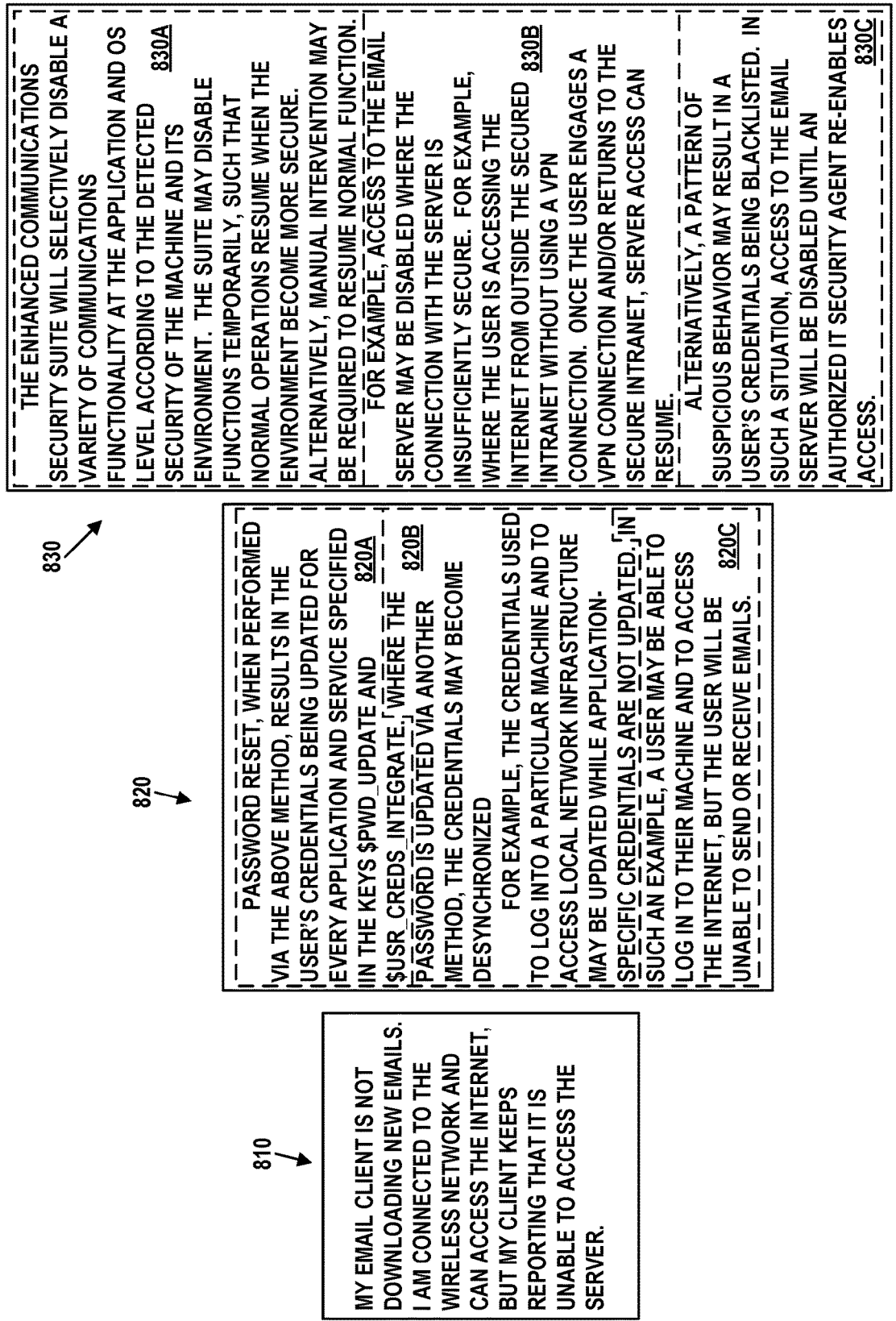
FIG. 8 depicts samples of text, in accordance with example embodiments.

FIG. 8 depicts an example query text sample 810, a first large text sample 820 and a second large text sample 830. The first large text sample 820 is divided into three segments of text 820A, 820B, 820C and the second large text sample 830 is divided into three segments of text 830A, 830B, 830C. The query text sample 810 could be a sample of text from an incident report. For example, the query text sample 810 could be the problem description field 606 from the incident report 600 depicted in FIG. 6. The large text samples could be articles in a knowledgebase or other database or fields of other incident reports.

The segments within such samples of text could be determined in a variety of ways. In some examples, the segments could be generated manually, for example, by the author of knowledgebase articles annotating the articles in order to indicate conceptually discrete segments of the article. Additionally or alternatively, the segments could be automatically generated. This could include determining the segments within a sample of text based on line breaks, punctuation, headers, or other information. A machine learning algorithm could be trained to identify segments within samples of text, e.g., based on a training set of query texts.

As shown in FIG. 8, the segments of text could be non-overlapping and could each represent sets of discrete sentences. However, FIG. 8 is intended as a non-limiting example of segments within samples of text, and other types of segmentation of text are anticipated. For example, the segments of text could include portions of sentences. That is, a segment of text could end and/or begin in the middle of a sentence. In some examples, the segments of text within a particular large sample of text could overlap. Such overlap could allow a transitional portion of the text to be associated with both a preceding portion of the text and with a subsequent portion of the text.

As noted above, similarity values could be determined between a query text and each segment within each sample of text in a corpus of text samples (e.g., between one or more fields of an incident report and a corpus of articles describing the resolution of past incident reports). These similarity values could then be used to select and provide to a user those segments that are most similar to the query text. The segments could be provided on their own or as part of the articles of which they are a part (e.g., with the selected segment(s) highlighted or otherwise indicated within the article).

Additionally or alternatively, the set of similarity values determined for the segments of a text sample could be used to determine an overall similarity value for the text sample. The overall similarity values could then be used to select and provide to a user those text samples that are most similar to the query text. The method used to generate the overall similarity value from the segment similarity values could be selected in order to affect the sorts of text samples that are selected.

In some examples, the overall similarity value for a text sample could be determined as the maximum of the similarity values of the text segments within the text sample. This method could be used in order to identify highly relevant segments of text even when those segments are part of text samples that are otherwise less relevant.

In some examples, a sum of the similarity values of the text segments could be determined as the overall similarity value of the text sample. This method could be used in order to identify text samples that include 'more' segments of text that are 'more' relevant to the query text. The sum could be normalized to the number of segments in the text sample (i.e., the overall similarity value could be an average of the segment similarity values) in order to emphasize text samples that are more 'on topic' with respect to content that is relevant to the query text.

In some examples, a weighted sum of some or all of the segment similarity values could be determined as the overall similarity value of the text sample. For example, the overall similarity value could be determined as a sum of 100% of the similarity value for the most similar segment, 80% of the similarity value for the second most similar segment, 60% of the similarity value for the third most similar segment, etc. In another example, an iterative method could be applied to add a weighted version of the similarity of each segment together. An example of this iterative method, for similarity values between 0 and 1 inclusive, can be represented as:

sort the segment similarity values from high to low
overall similarity value←highest segment score
for the remainder of the segments [i]=2 to end:
   if the similarity value for segment[i]>=overall similarity value/$\rho$ overall similarity value←overall similarity value+(1−overall similarity value)*similarity value for segment[i]

The parameter $\rho$ can be beneficially set to a value between 1 and 2, inclusive. If a value of 1 is chosen, only the highest similarity value will be considered. The weighting parameter $\rho$ is provided so that text samples with multiple low-value segments do not end up with a higher overall score than a text sample that has a single segment with a high similarity value. Additionally, this method ensures that the overall similarity value is not greater than 1, no matter the number of segments within a particular text sample.

For These methods could be used in order to identify text samples that have a few 'highly relevant' segments while also identifying text samples that include multiple segments that are individually less relevant but that may, in aggregate, be relevant to the query text. The number of segment similarity values used to generate the weighted sum could be limited, e.g., to the top three segments. This could be done in order to emphasize text samples that include fewer segments with higher similarity scores relative to text samples that have larger number of relatively less relevant segments.

In some examples, the text segment similarity could be compared to a threshold in order to determine an overall similarity value for a text sample. For example, only segment similarity values that exceed a threshold similarity value could be summed together to generate an overall text sample similarity value. In another example, the number of segment similarity values that exceed the threshold similarity value could be determined as the overall text sample similarity value. Such threshold-comparison methods could be used in order to base the assessment of the overall relevance of the text samples only on those segments that are likely to be actually relevant to the query text. The individual segments' similarity values being greater than the threshold level can be used as a proxy for such a likelihood. The count of supra-threshold similarity values could be normalized to the number of segments in the text sample in order to emphasize those text samples that are fractionally more directed toward content that is relevant to the query text.

VI. NATURAL LANGUAGE PROCESSING OF TEXT QUERIES BASED ON SEMANTIC CONTENT

The degree of similarity between two samples of text can be determined in a variety of ways. The two samples of text could be a text field of an incident report and a text field of another incident report, a text field of a resolved incident report, a knowledgebase article, or some other sample of text that may be relevant to the resolution, classification, or other aspects of an incident report. Additionally or alternatively, one or both of the samples could be segments of text within a larger sample of text. As noted above, a degree of overlap between the identities of words present in the two samples of text and/or a word matrix method could be used to determine the degree of similarity. Additionally or alternatively, one or more techniques of natural language processing could be applied to compare the samples of text such that the context or other semantic content of the texts affects the determined similarity value between the samples of text.

Such techniques may be applied to improve text query matching related to incident reports. These techniques may include a variety of machine learning algorithms that can be trained based on samples of text. The samples of text used for training can include past examples of incident reports, knowledgebase articles, or other text samples of the same nature as the text samples to which the trained model will be applied. This has the benefit of providing a model that has been uniquely adapted to the vocabulary, topics, and idiomatic word use common in its intended application.

Such techniques can include determining word and/or paragraph vectors from samples of text, applying ANNs or other deep learning algorithms, performing sentiment analysis, or other techniques in order to determine a similarity between samples of text, to group multiple samples of text together according to topic or content, to partition a sample of text into discrete internally-related segments, to determine statistical associations between words, or to perform some other language processing task. Below, a particular method for determining similarity values between samples of text using an ANN model that provides compact semantic representations of words and text strings is provided as a non-limiting example of such techniques. However, other techniques may be applied to generate similarity values between samples of text as applied elsewhere herein. In the discussion below, there are two approaches for training an ANN model to represent the sematic meanings of words:

word vectors and paragraph vectors. These techniques may be combined with one another or with other techniques.

These techniques may also be applied to partition segments of text into multiple text segments. Such partitioning can allow for more fine-grained detection of similarity between query texts (e.g., a problem description field of an incident report) and larger samples of text. This is because a similarity value can be determined between the query text and each of the segments of the large sample of text. As a result, the relevance of samples of text that are largely unrelated to the query text, but that include a subsection of high relevance to the query text, may be detected.

A. Word Vectors

A "word vector" may be determined for each word present in a corpus of text records such that words having similar meanings (or "semantic content") are associated with word vectors that are near each other within a semantically encoded vector space. Such vectors may have dozens, hundreds, or more elements. These word vectors allow the underlying meaning of words to be compared or otherwise operated on by a computing device. Accordingly, the use of word vectors may allow for a significant improvement over simpler word list or word matrix methods.

Word vectors can be used to quickly and efficiently compare the overall semantic content of samples of text, allowing a similarity value between the samples of text to be determined. This can include determining a distance, a cosine similarity, or some other measure of similarity between the word vectors of the words in each of the text samples. For example, a mean of the word vectors in each of the text samples could be determined and a cosine similarity between the means then used as a measure of similarity between the text samples. Additionally or alternatively, the word vectors may be provided as input to an ANN, a support vector machine, a decision tree, or some other machine learning algorithm in order to perform sentiment analysis, to classify or cluster samples of text, to determine a level of similarity between samples of text, or to perform some other language processing task.

Figure 9A:
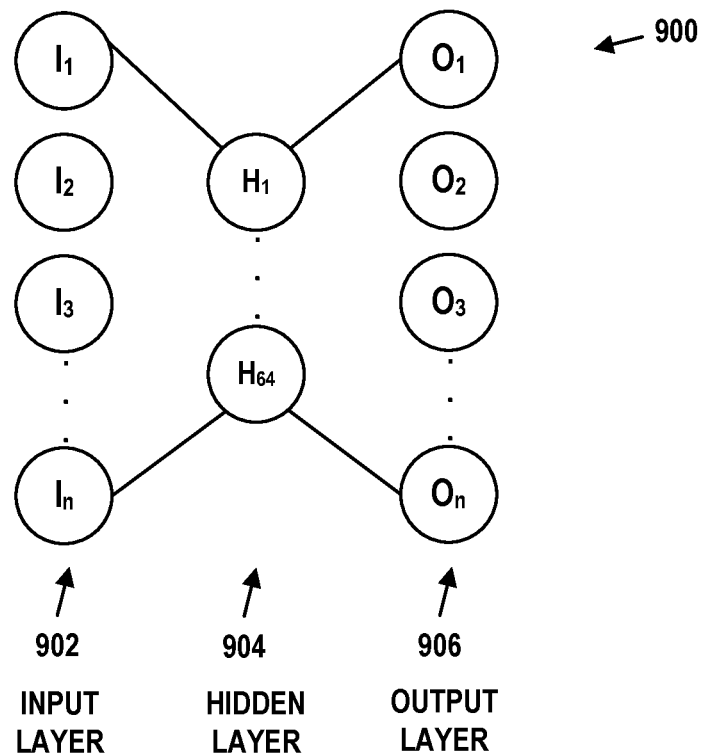
FIG. 9A depicts an artificial neural network (ANN) configured for learning the contextual meanings of words, in accordance with example embodiments.

Word vectors may be determined for a set of words in a variety of ways. In an example, a matrix of the word vectors can be an input layer of an ANN. The ANN (including the matrix of word vectors) can then be trained with a large number of text strings from a database to determine the contextual relationships between words appearing in these text strings. Such an ANN 900 is shown in FIG. 9A. ANN 900 includes input layer 902, which feeds into hidden layer 904, which in turn feeds into output layer 906. The number of nodes in input layer 902 and output layer 906 may be equivalent to the number of words in a pre-defined vocabulary or dictionary (e.g., 20,000, 50,000, or 100,000). The number of nodes in hidden layer 904 may be much smaller (e.g., 64 as shown in FIG. 9A, or other values such as 16, 32, 128, 512, 1024, etc.).

Figure 9B:
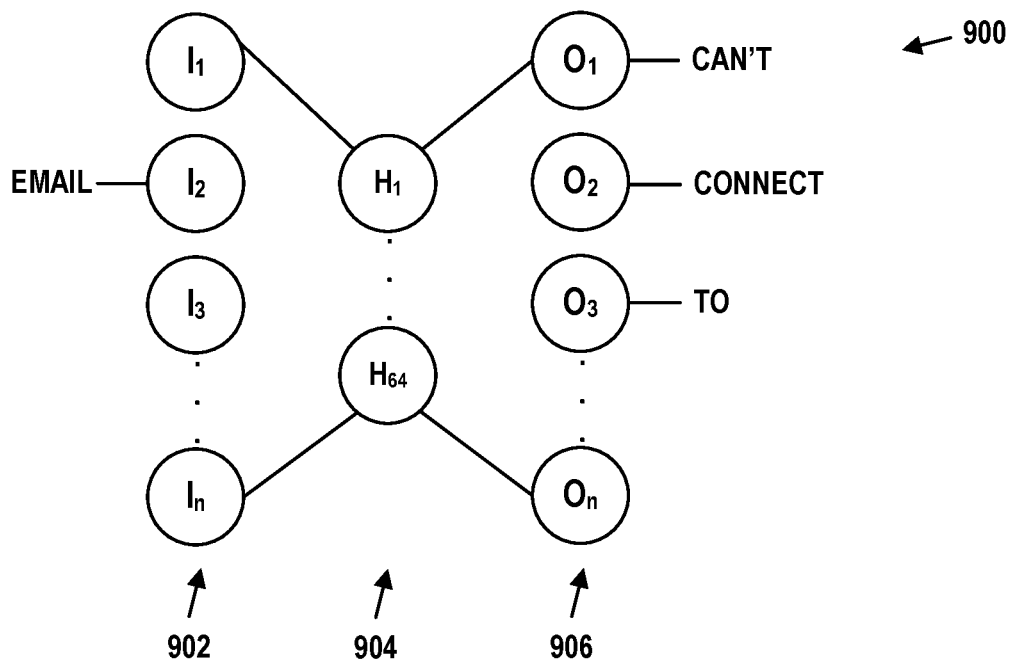
FIG. 9B depicts a set of training data for the ANN of FIG. 9A, in accordance with example embodiments.

For each text string in the database, ANN 900 is trained with one or more arrangements of words. For instance, in FIG. 9B, ANN 900 is shown being trained with input word "email" and output (context) words "can't", "connect" and "to". The output words serve as the ground truth output values to which the results produced by output layer 906 are compared. This arrangement reflects that "email" appears proximate to "can't", "connect" and "to" in a text string in database 702.

In an implementation, this could be represented as node $I_2$ receiving an input of 1, and all other nodes in input layer 902 receiving an input of 0. Similarly, node $O_1$ is associated with a ground truth value of "can't", node $O_2$ is associated with a ground truth value of "connect", and node $O_3$ is associated with a ground truth value of "to". In the implementation, this could be represented as nodes $O_1$, $O_2$, and $O_3$ being associated with ground truth values of 1 and all other nodes in output layer 906 being associated with ground truth values of 0. The loss function may be a sum of squared errors, for example, between the outputs generated by output layer 906 in response to the input described above and a vector containing the ground truth values associated with the output layer nodes.

Figure 9C:
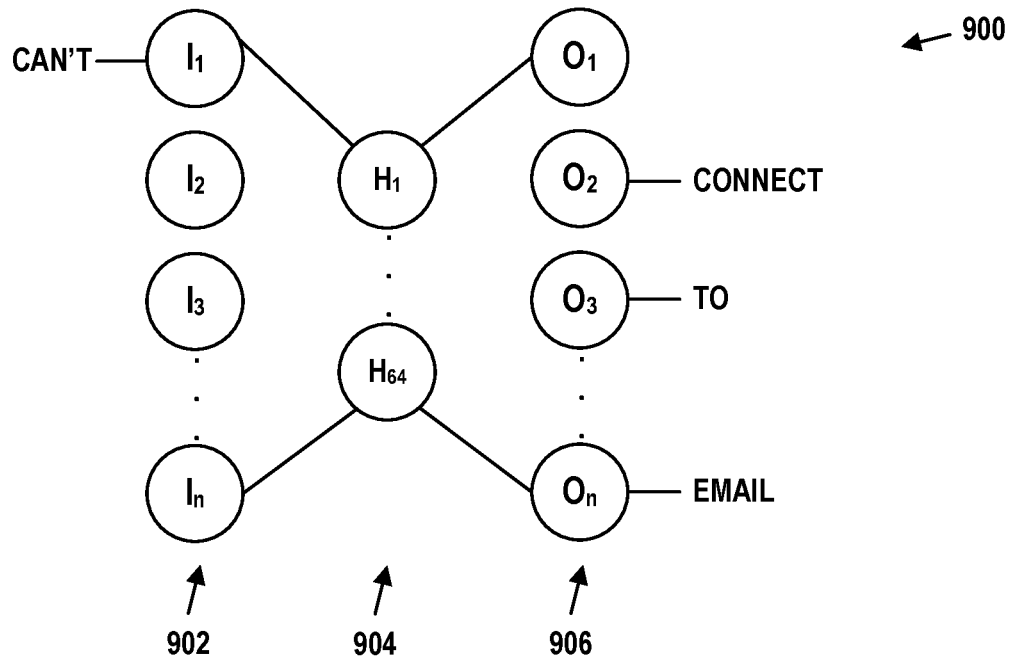
FIG. 9C depicts a set of training data for the ANN of FIG. 9A, in accordance with example embodiments.
Figure 9D:
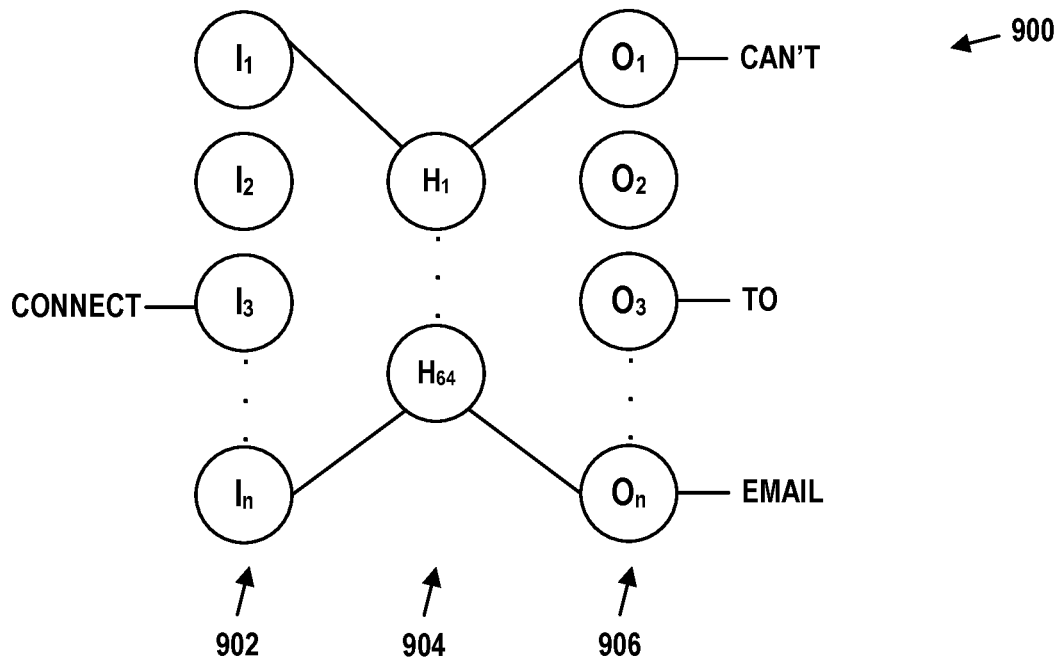
FIG. 9D depicts a set of training data for the ANN of FIG. 9A, in accordance with example embodiments.

Other arrangements of this text string from database 702 may be used to train ANN 900. For instance, as shown in FIG. 9C, the input word may be "can't" and the output words may be "connect", "to", and "email." In another example, as shown in FIG. 9D, the input word may be "connect" and the output words may be "can't", "to", and "email."

In general, these arrangements may be selected so that the output words are within w words of the input word (e.g., where w could be 1, 2, 3, 5, etc.), the output words are in the same sentence as the input word, the output words are in the same paragraph as the input word, and so on. Furthermore, various word arrangements of each text string in database 702 may be used to train ANN 900. These text strings may be selected from short description field 605, problem description field 606, category field 608, resolution field 614, notes field 620, and/or any other field or combination of fields in an incident report.

After ANN 900 is trained with these arrangements of text strings, hidden layer 904 becomes a compact vector representation of the context and meaning of an input word. That is, the weightings from a particular node (e.g., $I_3$) in the input layer 902 to the hidden layer 904 represent the elements of the word vector of the word corresponding to the particular node (e.g., "can't"). For example, assuming that ANN 900 is fully-trained with a corpus of 10,000 or so text strings (though more or fewer text strings may be used), an input word of "email" may have a similar vector representation of an input word of "mail". Intuitively, since hidden layer 904 is all that ANN 900 has to determine the context of an input word, if two words have similar contexts, then they are highly likely to have similar vector representations.

In some embodiments, ANN 900 can be trained with input words associated with the output nodes $O_1 \ldots O_n$ and the output (context) words associated with input nodes $I_1 \ldots I_n$. This arrangement may produce an identical or similar vector for hidden layer 904.

Furthermore, vectors generated in this fashion are additive. Thus, subtracting the vector representation of "mail" from the vector representation of "email" is expected to produce a vector with values close to 0. However, subtracting the vector representation of "VPN" from the vector representation of "email" is expected to produce a vector with higher values. In this manner, the model indicates that "email" and "mail" have closer meanings than "email" and "VPN".

Once vector representations have been determined for all words of interest, linear and/or multiplicative aggregations of these vectors may be used to represent text strings. For instance, a vector for the text string "can't connect to email" can be found by adding together the individual vectors for the words "can't", "connect", "to", and "email". In some cases, an average or some other operation may be applied to the vectors for the words. This can be expressed below as the vector sum of m vectors $v_i$ with each entry therein divided by m, where $i=\{1 \ldots m\}$. But other possibilities, such as weighted averages, exist.

$$v_{avg} = \frac{1}{m}\sum_{i=1}^{m} v_i \quad (1)$$

Regardless of how the aggregations are determined, this general technique allows vector representations for each text string in database 702 to be found. These vector representations may be stored in database 702 as well, either along with their associated text strings or separately. These vector representations can then be used to compare the text strings, cluster or group the text strings, train some other machine learning classifier, or to perform some other task. For example, a matching text string for a particularly query text may be determined by determining a cosine similarity or other similarity value between the vector representation of the query text and the stored vector representations of samples of text in the database 702.

The comparison may identify one or more text string vectors from database 702 that "match" in this fashion. In some cases this may be the k text string vectors with the highest similarity, or any text string vector with a similarity that is greater than a pre-determined value. The identified text string vectors could correspond to a subset of incident reports, within a greater corpus of incident reports that is recorded in the database 702, that are relevant to an additional incident report that corresponds to the query text string vector. For each of the identified text string vectors, the associated text string may be looked up in database 702 and provided as an output text string. In some cases, the associated incident reports may be provided as well.

In some cases, only incident reports that are not older than a pre-determined age are provided. For instance, the system may be configured to identify text string vectors only from incident reports that were resolved within the last 3 months, 6 months, or 12 months. Alternatively, the system may be configured to identify text string vectors only from incident reports that were opened within the last 3 months, 6 months, or 12 months.

In this fashion, incident reports with similar problem descriptions as that of the input text string can be rapidly identified. Notably, this system provides contextual results that are more likely to be relevant and meaningful to the input text string. Consequently, an individual can review these incident reports to determine how similar problems as that in the problem description have been reported and addressed in the past. This may result in the amount of time it takes to resolve incidents being dramatically reduced.

Additionally or alternatively, these embodiments can be applied to detect and identify clusters of semantically and/or contextually similar incident reports within a corpus of incident reports. For example, clusters of incident reports related to a similar issue that is likely to affect users of an IT system, an ongoing misconfiguration of one or more aspects of an IT system, a progressive hardware failure in a component of an IT system, or some other recurring issue within an IT system. Identifying such clusters of related incident reports can allow the IT system to be repaired or upgraded (e.g., by replacing and/or reconfiguring failing or inconsistently performing hardware or software), users to be trained to avoid common mistakes, rarely-occurring hardware or software issues to be detected and rectified, or other benefits.

Such clusters of relevant incident reports can be detected and/or identified by identifying, within the semantically encoded vector space, aggregated word (and/or paragraph) vectors corresponding to the incident reports. A variety of methods could be employed to detect such clusters within the semantically encoded vector space, e.g., k-means clustering, support vector machines, ANNs (e.g., unsupervised ANNs configured and/or trained to identify relevant subsets of training examples within a corpus of available training examples), or some other classifier or other method for identifying clusters of related vectors within a vector space.

B. Paragraph Vectors

As discussed previously, ANN model 900 uses the surrounding context to provide compact, semantically relevant vector representations of words. After training, words with similar meanings can map to a similar position in the vector space. For example, the vectors for "powerful" and "strong" may appear close to each other, whereas the vectors for "powerful" and "Paris" may be farther apart. Additions and subtractions between word vectors also carry meaning. Using vector algebra on the determined word vectors, we can answer analogy questions such as "King"–"man"+"woman"="Queen."

However, the complete semantic meaning of a sentence or other passage (e.g., a phrase, several sentences, a paragraph, a text segment within a larger sample of text, or a document) cannot always be captured from the individual word vectors of a sentence (e.g., by applying vector algebra). Word vectors can represent the semantic content of individual words and may be trained using short context windows. Thus, the semantic content of word order and any information outside the short context window is lost when operating based only on word vectors.

Take for example the sentence "I want a big green cell right now." In this case, simple vector algebra of the individual words may fail to provide the correct semantic meaning of the word "cell," as the word "cell" has multiple possible meanings and thus can be ambiguous. Depending on the context, "cell" could be a biological cell, a prison cell, or a cell of a cellular communications network. Accordingly, the paragraph, sentence, or phrase from which a given word is sampled can provide crucial contextual information.

In another example, given the sentence "Where art thou_," it is easy to predict the missing word as "Romeo" if sentence was said to derive from a paragraph about Shakespeare. Thus, learning a semantic vector representation of an entire paragraph can help contribute to predicting the context of words sampled from that paragraph.

Figure 10A:
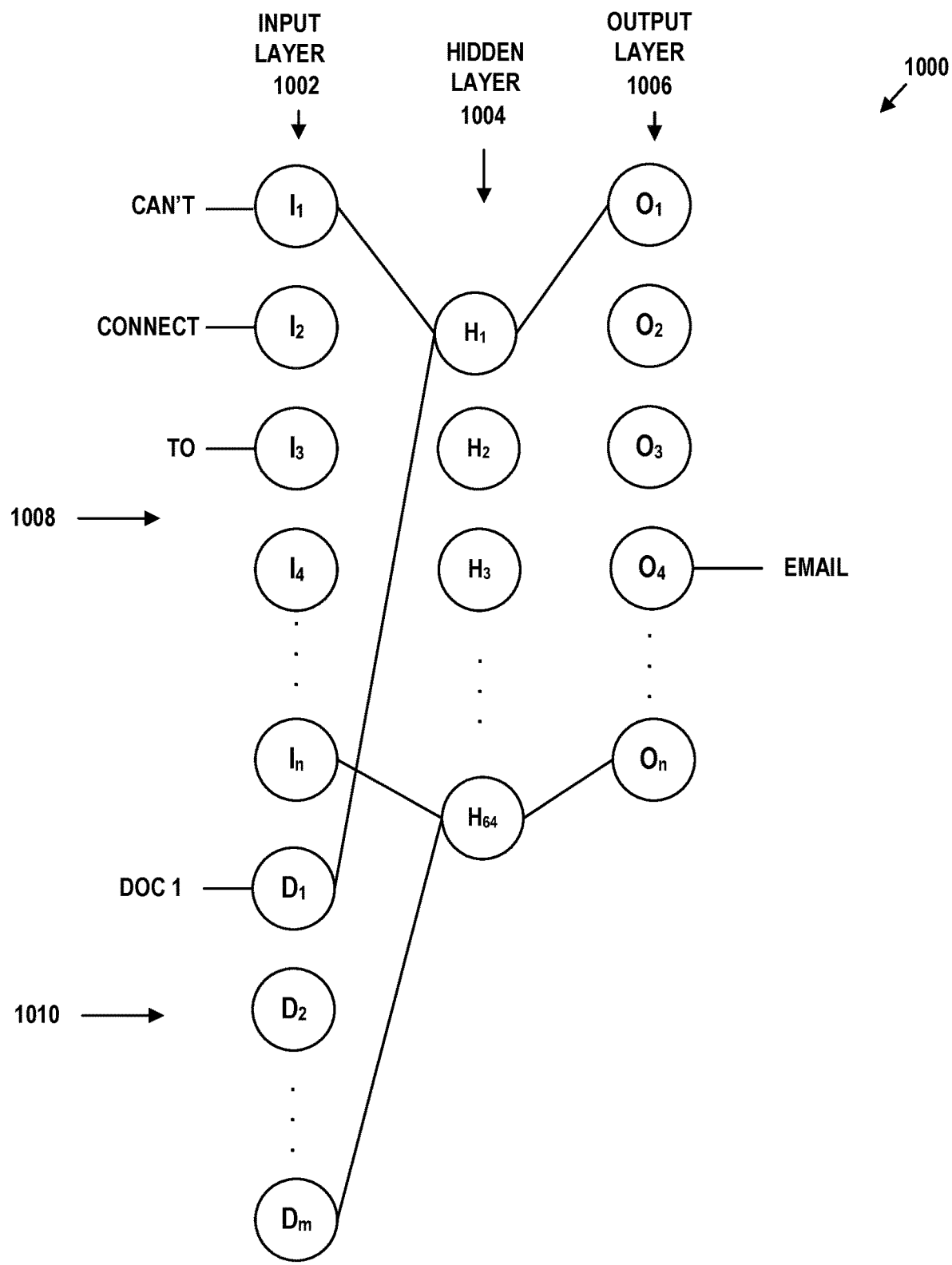
FIG. 10A depicts training an ANN for paragraph vectors, in accordance with example embodiments.

Similar to the methods above for learning word vectors, an ANN or other machine learning structures may be trained using a large number of paragraphs in a corpus to determine the contextual meaning of entire paragraphs, sentences, phrases, or other multi-word text samples as well as to determine the meaning of the individual words that make up the paragraphs in the corpus. Such an ANN 1000 is shown in FIG. 10A. ANN 1000 includes input layer 1002, which feeds into hidden layer 1004, which in turn feeds into output layer 1006. Note that input layer 1002 consists of two types of input substructures, the top substructure 1008 (consisting of input nodes $I_1 \ldots I_n$) representing words and the bottom substructure 1010 (consisting of input nodes $D_1 \ldots D_m$) representing paragraphs (documents). The number of nodes in output layer 1006 and the top input layer substructure 1008 may be equal to the number of unique words in the entire corpus. The number of nodes in the bottom input layer substructure 1010 may be equivalent to the number of unique paragraphs in the entire corpus. Note that "paragraph," as used herein, may be a sentence, a paragraph, one or more fields of an incident report, a segment of a larger string of text, or some other multi-word string of text.

For each paragraph in the corpus, ANN 1000 is trained with fixed-length contexts generated from moving a sliding window over the paragraph. Thus, a given paragraph vector is shared across all training contexts created from its source paragraph, but not across training contexts created from other paragraphs. Word vectors are shared across training contexts created from all paragraphs, e.g., the vector for "cannot" is the same for all paragraphs. Paragraphs are not limited in size; they can be as large as entire documents or as small as a sentence or phrase. In FIG. 10A, ANN 1000 is shown in a single training iteration, being trained with input word context "can't," "connect" and "to," input paragraph context DOC 1, and output word "email." The output word serves as the ground truth output value to which the result produced by output layer 1006 is compared. This arrangement reflects that "email" appears proximate to "can't", "connect", and "to", and is within DOC 1.

In an implementation, this could be represented as output node $O_4$ receiving a ground truth value of 1 and all other nodes in output layer 1006 having ground truth values of 0. Similarly, node $I_1$ has a ground truth value of "can't," node $I_2$ has a ground truth value of "connect," node $I_3$ has a ground truth value of "to," and node $D_1$ has ground truth value of DOC 1. In the implementation, this could be represented as nodes $I_1$, $I_2$, $I_3$, and $D_1$ being associated with values of 1 and all other nodes in input layer 1002 having values of 0. The loss function may be a sum of squared errors, for example, between the output of output layer 1006 and a vector containing the ground truth values. The weight values of the corresponding word vectors and paragraph vectors, as well all the output layer parameters (e.g., softmax weights) are updated based on the loss function (e.g., via backpropagation).

Figure 10B:
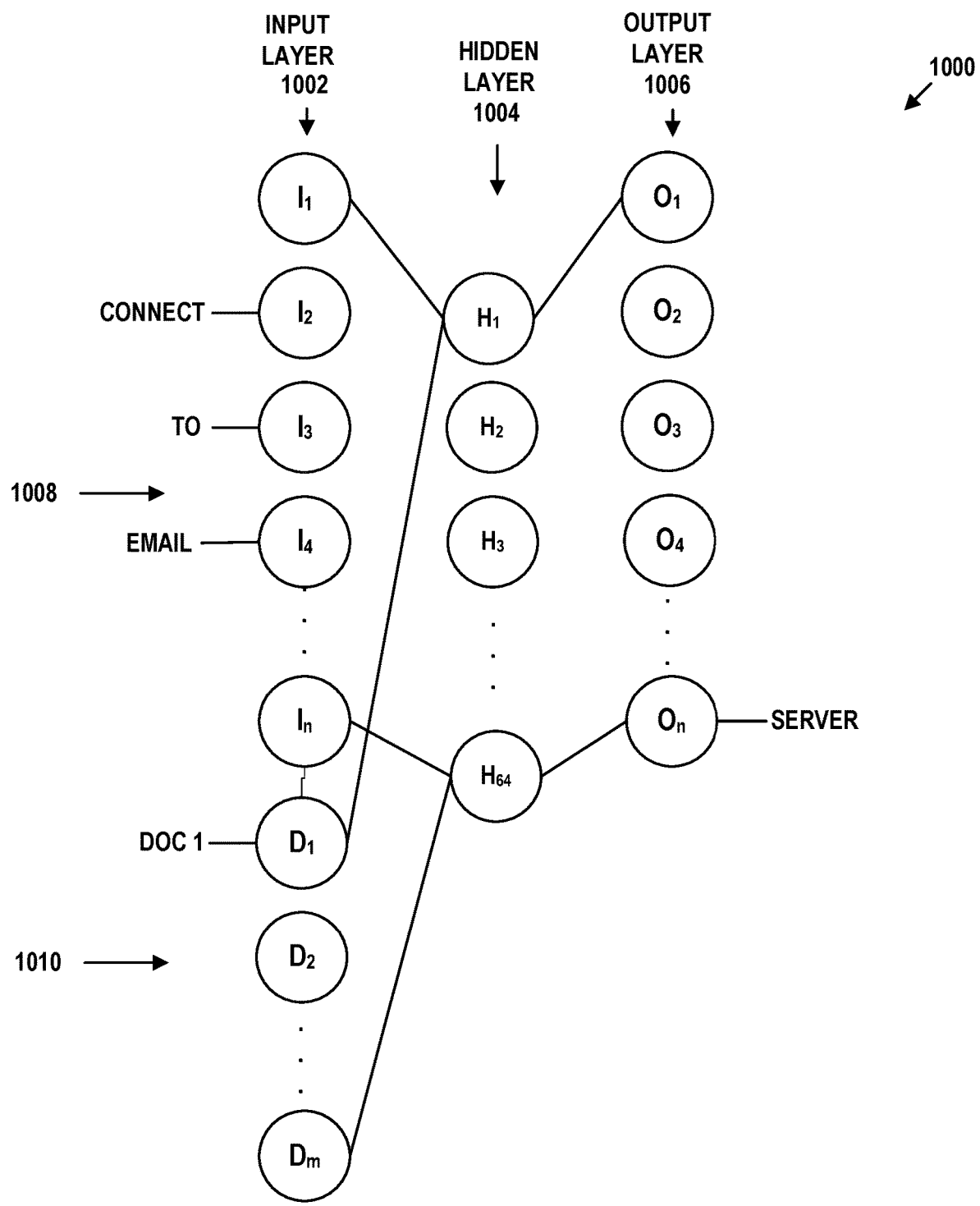
FIG. 10B depicts training an ANN for paragraph vectors, in accordance with example embodiments.

FIG. 10B shows ANN 1000 being trained with a subsequent context window. This context window derives from the same document, but shifts ahead a word in the document and uses input word context "connect," "to" and "email," input paragraph context DOC 1, and output word "server." In an implementation, these inputs and outputs can be encoded with ground truth values as similarly described above.

Figure 10C:
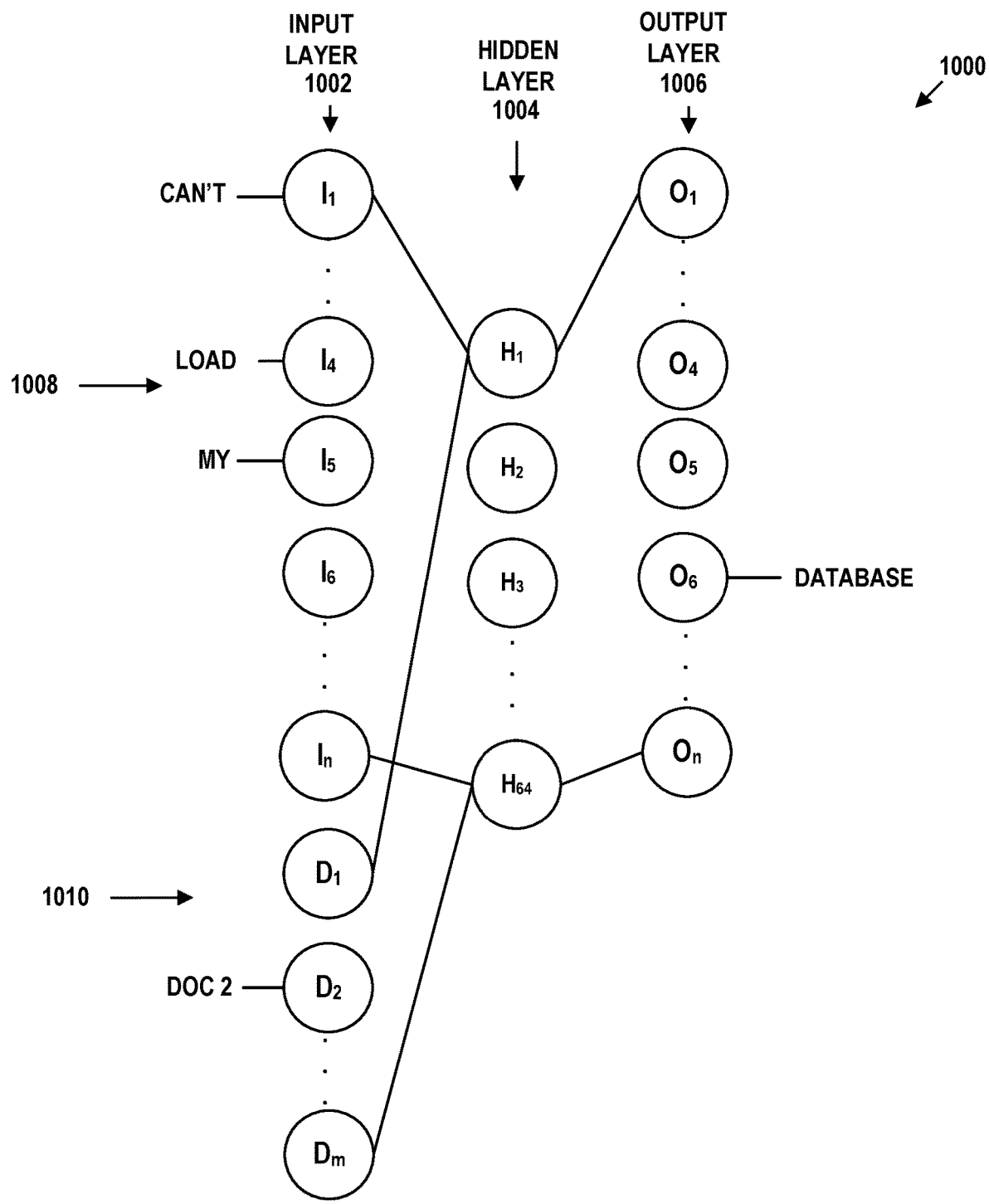
FIG. 10C depicts training an ANN for paragraph vectors, in accordance with example embodiments.

FIG. 10C shows an instance of ANN 1000 trained with another document within the corpus. The context window derives from this document and uses input word context "can't", "load", and "my", input paragraph context DOC 2, and output word "database." In an implementation, these inputs and outputs can be encoded with ground truth values as similarly described above.

After ANN 1000 is trained, the weights associated with hidden layer 1004 become a compact vector representation of the context and meaning of input words and paragraphs. For example, assuming that ANN 1000 is fully-trained with a corpus of 1,000 paragraphs, with the entire corpus containing 10,000 unique words, each paragraph and each word can be represented by a unique vector with a length equal to the number of hidden nodes in hidden layer 1004. These unique vectors encode the contextual meaning of words within the paragraphs or the paragraphs themselves.

Figure 10D:
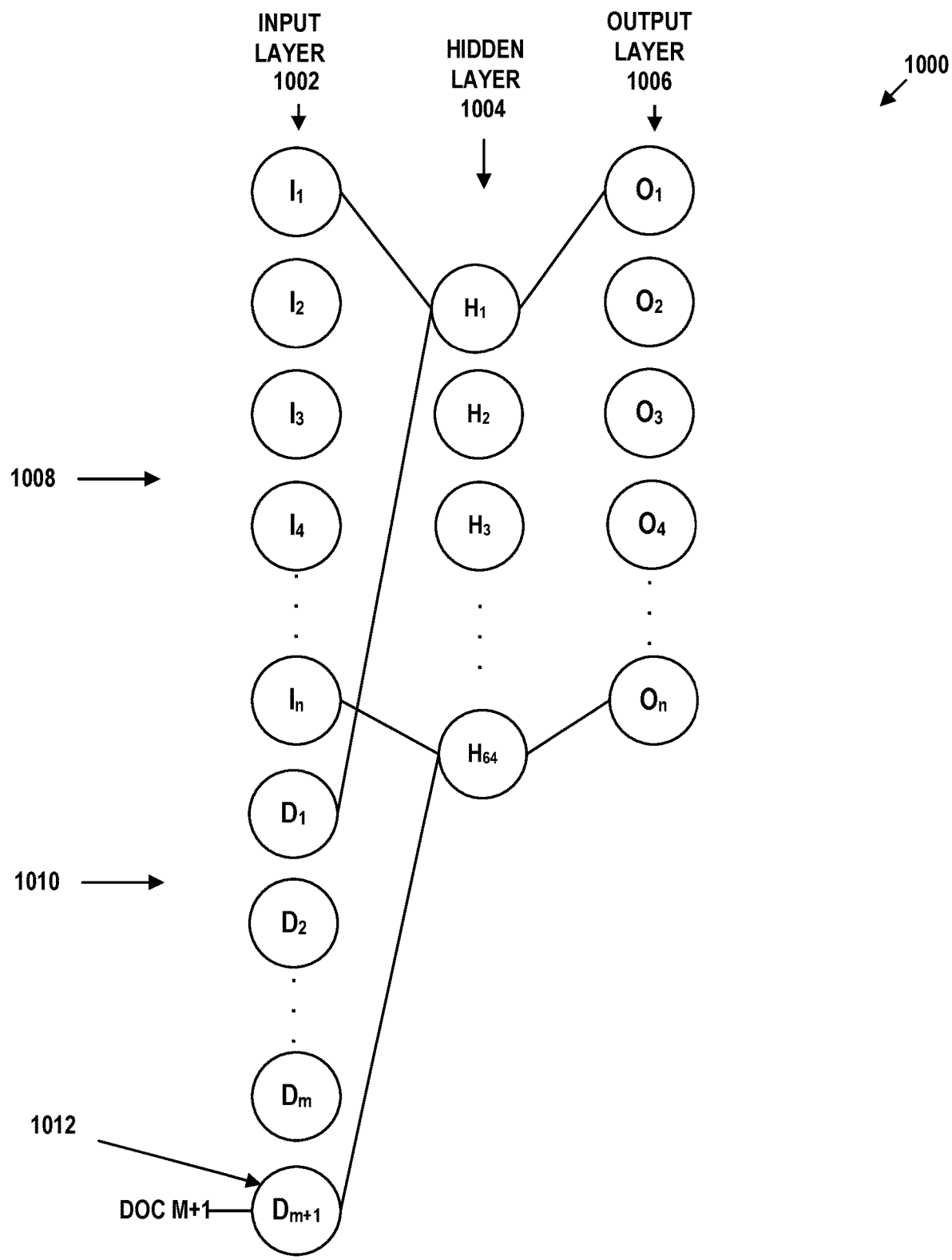
FIG. 10D depicts using a trained ANN to determine the paragraph vector of a previously unseen paragraph, in accordance with example embodiments.

FIG. 10D shows ANN 1000 at prediction time performing an inference step to compute the paragraph vector for a new, previously unseen paragraph. This inference step begins by adding an additional input node 1012 to input layer substructure 1010 that represents the unseen paragraph (DOC M+1). During this inference process, the coefficients of the word vectors substructure 1008 and the learned weights between hidden layer 1004 and output layer 1006 are held fixed. Thus, the model generates an additional paragraph vector 1012, corresponding to the unseen paragraph in the input paragraph vector substructure 1010, to obtain the new semantic vector representation of the unseen paragraph. Any additional unseen paragraphs can be trained through a similar process by adding input nodes to input layer substructure 1010.

Alternatively, paragraph vectors can be trained by ignoring word context in the input layer, only using the paragraph vector as the input, and forcing the model to predict different word contexts randomly sampled from the paragraph in the output layer. The input layer of such an ANN only consists of paragraph vectors, while the output layer represents a single context window that is randomly generated from a given paragraph. Training such an ANN may result in a vector representation for the semantic content of paragraphs in the corpus, but will not necessarily provide any semantic vector representations for the words therein.

Once vector representations have been determined for paragraphs in the corpus, linear and/or multiplicative aggregation of these vectors may be used to represent topics of interest. Furthermore, if the dimensions of paragraph vectors are the same as the dimensions of word vectors, as shown in ANN 1000, then linear and multiplicative aggregation between word vectors and paragraphs vectors can be obtained. For example, finding the Chinese equivalent of "Julius Caesar" using an encyclopedia as a corpus can be achieved by vector operations PV("Julius Caesar")−WV("Roman")+WV("Chinese"), where PV is a paragraph vector (representing an entire Wikipedia article) and WV are word vectors. Thus, paragraph vectors can achieve the same kind of analogies to word vectors with more context-based results.

In practice, such learned paragraph vectors can be used as inputs into other supervised learning models, such as sentiment prediction models. In such models, which can include but are not limited to ANNs, Support Vector Machines (SVMs), or Naïve Bayes Classifiers, paragraph vectors are used as input with a corresponding sentiment label as output. Other metrics such as cosine similarity and nearest neighbors clustering algorithms can be applied to paragraph vectors to find or group paragraphs on similar topics within the corpus of paragraphs.

In the present embodiments, a combination of learned word vectors and paragraph vectors can help determine the structure and meaning of incidents reports, for example incident report 600 as shown in FIG. 6. Incident report 600 consists of a number of fields in the left column, at least some of which are associated with values in the right column. For longer text fields, such as short description field 605, problem description field 606, resolution field 614, and notes field 620, it may be preferable to represent the associated right column text as a paragraph vector, or as multiple paragraph vectors corresponding to respective text segments within the right column text, to gain more contextual meaning rather than aggregating the individual word vectors that form the text. Incident report 600 is presented for purpose of example. Various fields of an incident report can be arranged to be represented as paragraph vectors, word vectors, or weighted combinations of the two. Other types of incident reports, problem reports, case files, or knowledgebase articles may also be used, and these reports may contain more, fewer, and/or different fields.

After representing different fields as paragraph vectors, word vectors, or weighted combinations of the two, a single vector to represent the entire incident can be generated by concatenating, generating a vector sum, or otherwise aggregating the word and/or paragraph vector representations of the individual incident fields. With a single aggregate incident vector representation, a system can be configured to identify similar aggregate vectors (and therefore similar incident reports) based on cosine similarity or other metrics as discussed above. Alternatively, a search for similar incident reports may use just the paragraph text of one or more individual fields. In this fashion, text from one or more individual fields in an incident report could be combined into a single paragraph of text. A paragraph vector could then be generated from this single, large paragraph of concatenated text and used to search for similar incidents.

This process can be illustrated in terms of the previously described ANN structures. Initially, text strings are obtained from database 702 of FIG. 7. As noted above, these text strings may be from parts of incident reports. Then, words are extracted from the text strings. The words extracted may be all of the words in the text strings or some of these words. These extracted words are provided as input to ANN 900 of FIGS. 9A-9D. The substring contexts of these words are extracted from the text strings. The sub string contexts may be one or more substrings containing words before, after, or surrounding the associated words that were extracted. These vector representations may then be used to compare (e.g., using cosine similarity) their respective text samples.

The comparison may identify one or more incident reports from database 702 that "match" in this fashion. In some cases this may be the k incident reports with the highest similarity, or any incident report with a similarity that is greater than a pre-determined value. The user may be provided with these identified incident reports or references thereto.

In some cases, only incident reports that are not older than a pre-determined age are provided. For instance, the system may be configured to only identify incident reports that were resolved within the last 3 months, 6 months, or 12 months. Alternatively, the system may be configured to only identify incident reports that were opened within the last 3 months, 6 months, or 12 months.

In this fashion, incident reports with similar content as that of the input incident report can be rapidly identified. Consequently, an individual can review these incident reports to determine how similar problems as that in the incident have been reported and addressed in the past. This may result in the amount of time it takes to resolve incidents being dramatically reduced.

While this section describes some possible embodiments of word vectors and paragraph vectors, other embodiments may exist. For example, different ANN structures and different training procedures can be used.

C. Partitioning of Text Tamples

As noted above, it can be beneficial to determine similarity between a query text and individual segments of a comparison text sample, rather than or in addition to determining a similarity between the query text and the comparison text sample as a whole. The segments may overlap or may be non-overlapping. The segments may be limited to containing discrete, whole paragraphs or sentences, or may be specified to include portions of sentences and/or paragraphs.

The segments may be determined manually. For example, a user could annotate a text sample to indicate the extent of conceptually discrete portions of the text sample. In some examples, this could include inserting sections headings, with the section heading being later used as indications of segments within the text sample. Additionally or alternatively, a sample of text could be segmented using an automatic algorithm.

Such an automatic algorithm could operate based on punctuation present in the text sample. For example, the algorithm could segment the text sample based on tabs, carriage return, and/or some other punctuation present in the text such that each paragraph and/or sentence within the text sample is assigned to a respective segment.

Additionally or alternatively, such an algorithm could incorporate natural language processing techniques in order to partition a sample of text. For example, the algorithm could operate to select partition boundaries to minimize a cost function that is related to the semantic similarity between the words within each segment. This could include minimizing a variance between the word vectors of the words within each segment.

In another example, a machine learning algorithm (e.g., an ANN) could be trained to receive samples of text and to generate segments therefrom. Such a machine learning algorithm could be trained to detect semantically-related segments of text within larger samples of text by being provided with training data that comprises examples of short samples of text that are related to a single concept. For example, the machine learning algorithm could be provided with a set of previously-received text queries (e.g., problem description fields from incident reports) and could be trained to identify segments within samples of text that exhibit similar properties. In another example, the machine learning algorithm could be trained to recognize words that precede punctuation (e.g., !?.) that signal the end of the sentence, such that segments may be determined based only that punctuation while avoiding segmentation based on non-sentence-ending punctuation (e.g., the period in "Dr."). In yet another example, the machine learning algorithm could be trained to detect part of speech tags in order to detect the extent of sentences (e.g., for languages that do not have punctuation).

VII. EXAMPLE OPERATIONS

Figure 11:
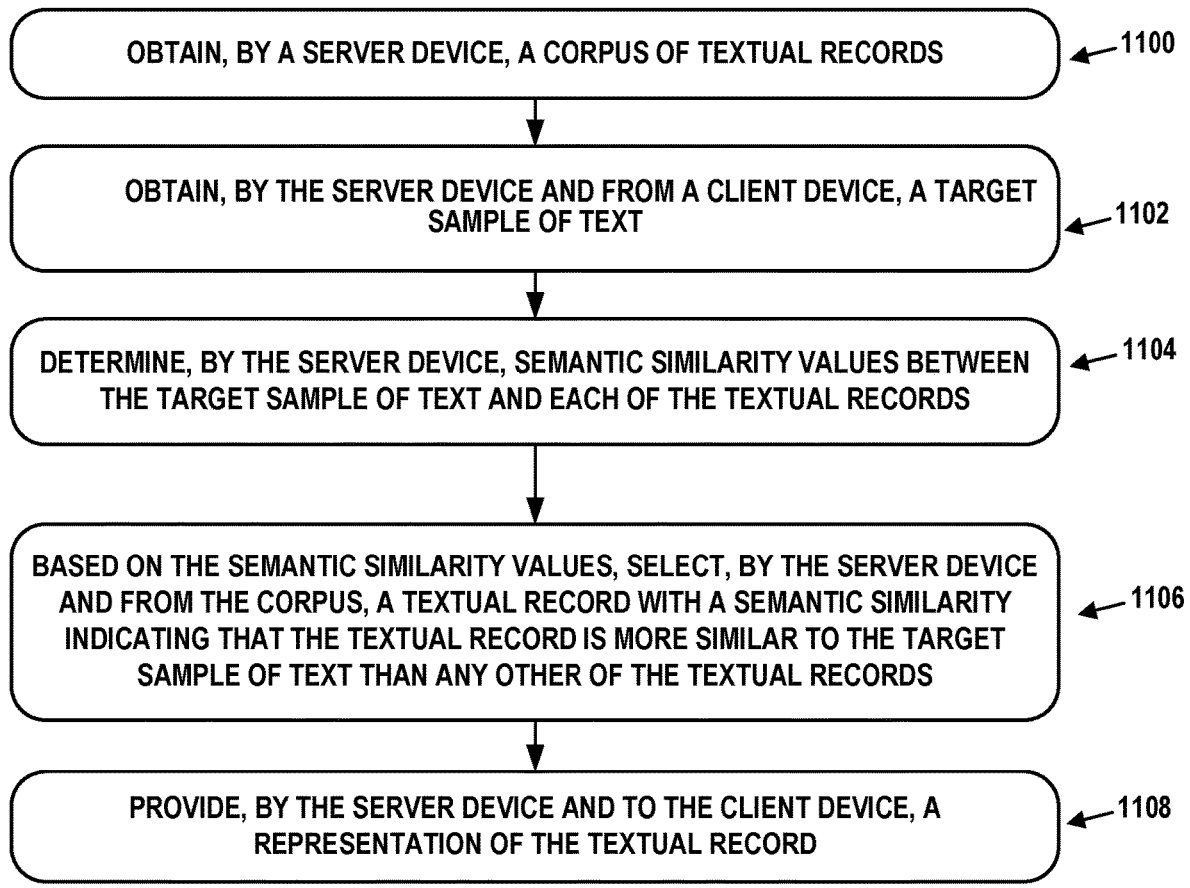
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

The example embodiment of FIG. 11 includes obtaining, by a server device, a corpus of textual records (1100). Each of the textual records includes a sample of text and an indication of one or more segments of text within the sample of text. At least one of the textual records includes an indication of at least two segments of text within the sample of text.

The example embodiment of FIG. 11 additionally includes obtaining, by the server device and from a client device, a target sample of text (1102).

The example embodiment of FIG. 1 additionally includes determining, by the server device, semantic similarity values between the target sample of text and each of the textual records (1104). Determining a particular semantic similarity value between the target sample of text and a particular textual record of the corpus includes: (i) determining individual semantic similarity values between the target sample of text and each of the segments of text indicated by the particular textual record, and (ii) generating the particular semantic similarity value between the target sample of text and the particular textual record based on the individual semantic similarity values.

The example embodiment of FIG. 11 additionally includes based on the semantic similarity values, selecting, by the server device and from the corpus, a textual record with a semantic similarity indicating that the textual record is more similar to the target sample of text than any other of the textual records (1106).

The example embodiment of FIG. 11 additionally includes providing, by the server device and to the client device, a representation of the textual record (1108).

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a processor; and
a memory, accessible by the processor, the memory storing instructions that, when executed by the processor, cause the processor to perform operations comprising:
providing a plurality of context vectors, wherein the plurality of context vectors were generated using a machine learning model by:
accessing an incident report database comprising a plurality of incident reports, wherein the plurality of incident reports comprise incident reports generated within a predetermined time;
generating, via the machine learning model, a plurality of respective segments of text from each incident report of the plurality of incident reports in the incident report; and
generating, via the machine learning model, one or more first paragraph vector representations of the plurality of respective segments of text from each incident report of the plurality of incident reports in the incident report database, comprising for each of the one or more first paragraph vector representations:
computing, via the machine learning model, one or more word contexts of the one or more first paragraph vector representations; and
outputting a respective context vector of the plurality of context vectors for each of the one or more first paragraph vector representations, wherein each respective context vector of the plurality of context vectors is indicative of the one or more word contexts of each of the one or more first paragraph vector representations; and obtaining, from a client device, a text query;

transforming the text query to a database query;

performing, via the machine learning model, an inference step to generate a target vector of the database query;

receiving the target vector of the database query, wherein the target vector comprises one or more second paragraph vector representations of the database query, one or more word vectors of the database query, or a weighted combination thereof;

generating one or more respective record semantic similarity values between the target vector of the database query and each context vector of the one or more first paragraph vector representations;

selecting from the incident report database, based on the one or more generated respective record semantic similarity values, a particular incident report having the highest respective record semantic similarity value; and providing, to the client device, a representation of the particular incident report, wherein the particular incident report provides a response to the text query.

2. The system of claim 1, wherein generating the one or more respective semantic similarity values between the target vector of the database query and each context vector of the one or more first paragraph vector representations comprises:

receiving the target vector of the database query, wherein the target vector of the database query includes the one or more word vectors that describe, in a first semantically-encoded vector space, a meaning of respective words of the database query, or the one or more second paragraph vector representations that describes, in a second semantically-encoded vector space, a meaning of multiple words of the database query, or both; and receiving one or more first paragraph vector representations of the plurality of respective segments of text from each incident report of the plurality of incident reports, wherein the one or more first paragraph vector representations of the plurality of respective segments of text from each incident report of the plurality of incident reports describes, in the second semantically-encoded vector space, a meaning of multiple words within the plurality of respective segments of text from each incident report of the plurality of incident reports.

3. The system of claim 1, wherein generating the respective record semantic similarity values comprises:

determining one or more respective segment semantic similarity values between the target vector of the database query and and each context vector of the one or more first paragraph vector representations;

comparing, to a threshold similarity level, each of the one or more respective segment semantic similarity values between the database query and each of the plurality of respective segments of text from the plurality of incident reports in the incident report database; and determining a number of the one or more respective segment semantic similarity values that exceed the threshold similarity level as the one or more respective record semantic similarity values.

4. The system of claim 1, wherein the plurality of respective segments of text from each incident report of the plurality of incident reports in the incident report database comprise non-overlapping segments of text.

5. The system of claim 1, wherein the plurality of respective segments of text from each incident report of the plurality of incident reports in the incident report database comprise one or more discrete sentences.

6. The system of claim 1, wherein generating the respective record semantic similarity values between the target vector of the database query and each context vector of the one or more first paragraph vector representations comprises:

determining respective semantic similarity values between the target vector of the database query and each context vector indicated by the particular incident report;

weighting the one or more respective semantic similarity values based on a ranking of the one or more respective semantic similarity values;

generating a sum of the weighted one or more respective semantic similarity values between each context vector on the one or more first paragraph vector representations of the plurality of respective segments of text from each incident report of the plurality of incident reports in the incident report database; and normalizing the sum of the weighted one or more respective semantic similarity values to a number of segments indicated by the particular incident report.

7. The system of claim 1, wherein each incident report of the plurality of incident reports in the incident report database comprises an indication of a time stamp within a predetermined time threshold.

8. A computer-implemented method comprising:

providing a plurality of context vectors, wherein the plurality of context vectors were generated by:

accessing, by a server device, an incident report database comprising a plurality of incident reports, wherein the plurality of incident reports comprise incident reports generated within a predetermined time;

generating a plurality of respective segments of text from each incident report of the plurality of incident reports in the incident report; and generating one or more first paragraph vector representations of the plurality of respective segments of text from each incident report of the plurality of incident reports in the incident report database, comprising for each of the one or more first paragraph vector representations:

computing one or more word contexts of the one or more first paragraph vector representations; and outputting a respective context vector of the plurality of context vectors for each of the first one or more paragraph vector representations, wherein each respective context vector of the plurality of context vectors is indicative of the one or more word contexts of each of the one or more first paragraph vector representations; and receiving, by the server device and from a client device, a text query;

transforming the text query to a database query;

performing an inference step to generate a target vector of the database query;

receiving the target vector of the database query, wherein the target vector comprises one or more second paragraph vector representations of the database query, one or more word vectors of the database query, or a weighted combination thereof;

generating, by the server device, one or more respective record semantic similarity values between the target vector of the database query and each context vector of the one or more first paragraph vector representations;

selecting from the incident report database, based on the one or more generated record semantic similarity values, a particular incident report having the highest respective semantic similarity value; and providing, by the server device and to the client device, a representation of the particular incident report, wherein the particular incident report provides a response to the text query.

9. The computer-implemented method of claim 8, wherein generating the one or more respective record semantic similarity values between the target vector of the database query and each context vector of the one or more first paragraph vector representations comprises:

receiving the target vector of the database query, wherein the target vector of the database query includes the one or more word vectors that describe, in a first semantically-encoded vector space, a meaning of respective words of the database query, or the one or more second paragraph vector representations that describes, in a second semantically-encoded vector space, a meaning of multiple words of the database query, or both; and receiving one or more first paragraph vector representations of the plurality of respective segments of text from each incident report of the plurality of incident reports, wherein the one or more first paragraph vector representations of the plurality of respective segments of text from each incident report of the plurality of incident reports describes, in the second semantically-encoded vector space, a meaning of multiple words within the plurality of respective segments of text from each incident report of the plurality of incident reports.

10. The computer-implemented method of claim 8, wherein generating the respective record semantic similarity values comprises:

determining one or more respective segment semantic similarity values between the target vector of the database query and and each context vector of the one or more first paragraph vector representations;

comparing, to a threshold similarity level, each of the one or more respective segment semantic similarity values between the database query and each of the plurality of respective segments of text from the incident report database; and determining a number of the one or more respective segment semantic similarity values that exceed the threshold similarity level as the one or more respective record semantic similarity values.

11. The computer implemented method of claim 8, wherein generating the plurality of respective segments of text from each incident report of the plurality of incident reports in the incident report database is based on one or more document properties, and wherein the method comprises partitioning, based on one or more indications, each incident report of the plurality of incident reports into the one or more respective segments of text.

12. The computer-implemented method of claim 8, wherein the plurality of respective segments of text from each incident report of the plurality of incident reports in the incident report database comprise non-overlapping segments of text.

13. The computer-implemented method of claim 8, wherein the plurality of respective segments of text from each incident report of the plurality of incident reports in the incident report database represent one or more discrete sentences.

14. The computer-implemented method of claim 8, comprising:

based on the generated respective record semantic similarity values, selecting, from the incident report database, two or more incident reports of the plurality of incident reports; and providing, to the client device, a representation of the two or more incident reports of the plurality of incident reports.

15. An article of manufacture including a non-transitory computer-readable medium, having stored thereon program instructions that, upon execution by a computing system, cause the computing system to perform operations comprising:

providing a plurality of context vectors, wherein the plurality of context vectors were generated by:

accessing, by a server device, an incident report database comprising a plurality of incident reports, wherein the plurality of incident reports comprise incident reports generated within a predetermined time;

generating a plurality of respective segments of text from each incident report of the plurality of incident reports in the incident report database; and generating one or more first paragraph vector representations of the plurality of respective segments of text from each incident report of the plurality of incident reports in the incident report database, comprising for each of the one or more first paragraph vector representations:

computing one or more word contexts of the one or more first paragraph vector representations; and outputting a respective context vector of the plurality of context vectors for each of the one or more first paragraph vector representations, wherein each respective context vector of the plurality of context vectors is indicative of the word contexts of each of the one or more first paragraph vector representations; and receiving, by the server device and from a client device, a text query;

transforming the text query to a database query;

performing an inference step to generate a target vector of the database query;

receiving the target vector of the database query, wherein the target vector comprises one or more second paragraph vector representations of the database query, one or more word vectors of the database query, or a weighted combination thereof;

generating, by the server device, one or more respective record semantic similarity values between the target vector of the database query and each context vector of the one or more first paragraph vector representations;

selecting from the incident report database, based on the one or more generated record semantic similarity values, a particular incident report having the highest respective semantic similarity value for the target vector of the database query; and providing, by the server device and to the client device, a representation of the particular incident report.

16. The article of manufacture of claim 15, wherein generating the one or more respective semantic similarity values between the target vector of the database query and each context vector of the one or more first paragraph vector representations comprises:

receiving the target vector of the database query, wherein the target vector of the database query includes the one or more word vectors that describe, in a first semantically-encoded vector space, a meaning of respective words of the database query, or the one or more second paragraph vector representations that describes, in a second semantically-encoded vector space, a meaning of multiple words of the database query, or both; and receiving one or more first paragraph vector representations of the plurality of respective segments of text from each incident report of the plurality of incident reports, wherein the one or more first paragraph vector representations of the plurality of respective segments of text from each incident report of the plurality of incident reports describes, in the second semantically-encoded vector space, a meaning of multiple words within the plurality of respective segments of text from each incident report of the plurality of incident reports.

17. The article of manufacture of claim 15, wherein generating the respective record semantic similarity values comprises:

comparing, to a threshold similarity level, each of the one or more respective semantic similarity values between the database query and each of the plurality of respective segments of text from the plurality of incident reports in the incident report database; and determining a number of the one or more respective semantic similarity values that exceed the threshold similarity level as the one or more respective record semantic similarity values.

18. The article of manufacture of claim 15, wherein each of the incident reports comprises an indication of a time stamp within a predetermined time threshold.

19. The article of manufacture of claim 15, wherein of the plurality of respective segments of text from each incident report of the plurality of incident reports in the incident report database comprise non-overlapping segments of text.

20. The article of manufacture of claim 15, wherein the operations further comprise:

based on the generated respective record semantic similarity values, selecting, from the incident report database, two or more incident reports of the plurality of incident reports; and providing, to the client device, a representation of the two or more incident reports of the plurality of incident reports.

* * * * *